US008001181B2

(12) United States Patent  (10) Patent No.: US 8,001,181 B2
Wilson et al.  (45) Date of Patent: *Aug. 16, 2011

(54) METHOD, SYSTEM AND APPARATUS FOR MESSAGING BETWEEN WIRELESS MOBILE TERMINALS AND NETWORKED COMPUTERS

(75) Inventors: Christopher Robert Dale Wilson, Carpentersville, IL (US); Mihaela Kamenova Mihaylova, Schaumburg, IL (US); Joseph Alan Page, Arlington Hts., IL (US)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/615,480

(22) Filed: Nov. 10, 2009

(65) Prior Publication Data

US 2010/0056109 A1  Mar. 4, 2010

Related U.S. Application Data

(63) Continuation of application No. 10/748,723, filed on Dec. 30, 2003, now Pat. No. 7,640,293, which is a continuation-in-part of application No. 10/245,918, filed on Sep. 18, 2002, now Pat. No. 7,072,941, which is a continuation-in-part of application No. 10/197,022, filed on Jul. 17, 2002.

(51) Int. Cl.
*G06F 15/16* (2006.01)
*G06F 15/173* (2006.01)
(52) U.S. Cl. ........ 709/203; 709/206; 709/207; 709/224; 709/239
(58) Field of Classification Search .................. 709/206, 709/224, 227; 455/466, 518, 519; 370/352
See application file for complete search history.

(56) References Cited

U.S. PATENT DOCUMENTS 5,528,671 A  6/1996 Ryu et al.
(Continued)

FOREIGN PATENT DOCUMENTS

CN  1348662 A  5/2002
(Continued)

OTHER PUBLICATIONS

The MIRC Workshop, http://web.archive.org/web/20020223232111/http://dooyoo-uk.tripod.com/mirc/irc.htm, Feb. 2002, pp. 1-8.

(Continued)

*Primary Examiner* — Quang N. Nguyen
(74) *Attorney, Agent, or Firm* — Allen, Dyer, Doppelt, Milbrath & Gilchrist, P.A.

(57) ABSTRACT

A system is disclosed for messaging between wireless mobile terminals operating on wireless carrier networks and networked computers. The mobile terminals and computers include client applications for communicating messages to one another using push-to-talk modality. A server, located on a packet network outside the wireless carrier networks, forwards messages between the mobile terminals and the computers. The messages consist of text or streaming voice. The server can also include gateways for forwarding messages from the mobile terminals and computers to external email and instant messaging (IM) users. By placing the server outside wireless carrier networks and using conventional packet network protocols such as the Internet protocol (IP), the system provides seamless inter-carrier push-to-talk and/or instant messaging between mobile terminal, networked computers, and users of third-party email and IM services.

25 Claims, 15 Drawing Sheets

U.S. PATENT DOCUMENTS

| | | | |
|---|---|---|---|
| 5,694,549 | A | 12/1997 | Carlin et al. |
| 5,742,905 | A | 4/1998 | Pepe et al. |
| 5,781,614 | A | 7/1998 | Brunson |
| 5,838,318 | A | 11/1998 | Porter et al. |
| 5,889,764 | A | 3/1999 | Needham et al. |
| 5,889,888 | A | 3/1999 | Marianetti, II et al. |
| 5,905,476 | A | 5/1999 | McLaughlin et al. |
| 5,987,401 | A | 11/1999 | Trudeau |
| 5,987,503 | A | 11/1999 | Murakami |
| 5,990,887 | A | 11/1999 | Red Path et al. |
| 5,991,796 | A | 11/1999 | Anapam et al. |
| 6,020,884 | A | 2/2000 | MacNaughton et al. |
| 6,061,716 | A | 5/2000 | Moncreiff ............ 709/204 |
| 6,078,948 | A | 6/2000 | Podgorny et al. |
| 6,081,830 | A | 6/2000 | Schindler |
| 6,157,814 | A | 12/2000 | Hymel et al. |
| 6,161,134 | A | 12/2000 | Wang et al. |
| 6,167,402 | A | 12/2000 | Yeager |
| 6,212,548 | B1 | 4/2001 | Desimone et al. |
| 6,286,034 | B1 | 9/2001 | Sato et al. |
| 6,301,609 | B1 | 10/2001 | Aravamundan et al. |
| 6,360,093 | B1 | 3/2002 | Ross et al. |
| 6,360,252 | B1 | 3/2002 | Rudy et al. |
| 6,370,563 | B2 | 4/2002 | Murakami et al. |
| 6,393,461 | B1 | 5/2002 | Okada et al. |
| 6,405,035 | B1 | 6/2002 | Singh |
| 6,430,567 | B2 | 8/2002 | Burridge |
| 6,430,604 | B1 | 8/2002 | Ogle et al. |
| 6,433,795 | B1 | 8/2002 | MacNaughton et al. |
| 6,434,604 | B1 | 8/2002 | Harada et al. |
| 6,446,112 | B1 | 9/2002 | Bunney et al. |
| 6,456,621 | B1 | 9/2002 | Wada et al. |
| 6,459,892 | B2 | 10/2002 | Burgan et al. |
| 6,471,521 | B1* | 10/2002 | Dornbush et al. |
| 6,480,885 | B1 | 11/2002 | Olivier |
| 6,484,196 | B1 | 11/2002 | Maurille |
| 6,499,053 | B1 | 12/2002 | Marquette et al. |
| 6,501,834 | B1 | 12/2002 | Milewski et al. |
| 6,539,237 | B1 | 3/2003 | Sayers et al. |
| 6,539,421 | B1 | 3/2003 | Appelman et al. |
| 6,549,768 | B1 | 4/2003 | Fraccaroli |
| 6,594,255 | B1 | 7/2003 | Newman |
| 6,597,903 | B1 | 7/2003 | Dahm et al. |
| 6,630,944 | B1 | 10/2003 | Kakuta et al. |
| 6,668,169 | B2 | 12/2003 | Burgan et al. |
| 6,677,976 | B2* | 1/2004 | Parker et al. |
| 6,681,108 | B1* | 1/2004 | Terry et al. |
| 6,721,784 | B1* | 4/2004 | Leonard et al. |
| 6,760,580 | B2* | 7/2004 | Robinson et al. |
| 6,785,712 | B1 | 8/2004 | Hogan et al. |
| 6,807,431 | B2* | 10/2004 | Sayers et al. |
| 6,901,255 | B2 | 5/2005 | Shostak |
| 6,930,994 | B1 | 8/2005 | Stubbs |
| 6,970,907 | B1 | 11/2005 | Ullmann et al. |
| 6,978,293 | B1 | 12/2005 | Wong et al. |
| 6,981,223 | B2 | 12/2005 | Becker et al. |
| 7,003,327 | B1* | 2/2006 | Payne et al. |
| 7,062,533 | B2 | 6/2006 | Brown et al. |
| 7,080,124 | B1 | 7/2006 | Shankar |
| 7,100,116 | B1 | 8/2006 | Shafrir et al. |
| 7,113,767 | B2 | 9/2006 | Vaananen |
| 2001/0031635 | A1* | 10/2001 | Bharatia |
| 2001/0042095 | A1* | 11/2001 | Kim et al. |
| 2001/0044787 | A1* | 11/2001 | Shwartz et al. |
| 2002/0007398 | A1* | 1/2002 | Mediola et al. |
| 2002/0016163 | A1* | 2/2002 | Burgan et al. |
| 2002/0022954 | A1* | 2/2002 | Shimohata et al. |
| 2002/0023128 | A1* | 2/2002 | Matsumoto et al. |
| 2002/0073154 | A1* | 6/2002 | Murakami et al. |
| 2002/0083035 | A1* | 6/2002 | Pearl et al. |
| 2002/0095679 | A1* | 7/2002 | Bonini |
| 2002/0112014 | A1* | 8/2002 | Bennett et al. |
| 2002/0133547 | A1* | 9/2002 | Lin |
| 2003/0003953 | A1* | 1/2003 | Houplain |
| 2003/0007464 | A1* | 1/2003 | Balani |
| 2003/0012348 | A1* | 1/2003 | Skladman et al. |
| 2003/0023691 | A1* | 1/2003 | Knauerhase |
| 2003/0028597 | A1* | 2/2003 | Salmi et al. |
| 2003/0030670 | A1 | 2/2003 | Duarte et al. |
| 2003/0126213 | A1* | 7/2003 | Betzler ............ 709/206 |
| 2003/0149774 | A1* | 8/2003 | McConnell et al. ...... 709/227 |
| 2003/0152040 | A1* | 8/2003 | Crockett et al. |
| 2003/0153339 | A1* | 8/2003 | Crockett et al. |
| 2003/0153340 | A1* | 8/2003 | Crockett et al. |
| 2003/0153341 | A1* | 8/2003 | Crockett et al. |
| 2003/0153342 | A1* | 8/2003 | Crockett et al. |
| 2003/0153343 | A1* | 8/2003 | Crockett et al. |
| 2003/0154243 | A1* | 8/2003 | Crockett et al. |
| 2003/0154249 | A1* | 8/2003 | Crockett et al. |
| 2003/0158902 | A1* | 8/2003 | Volach |
| 2003/0236823 | A1* | 12/2003 | Patzer et al. |
| 2004/0015548 | A1* | 1/2004 | Lee |
| 2004/0039779 | A1* | 2/2004 | Armstrong et al. |
| 2004/0078304 | A1* | 4/2004 | Gabbard et al. |
| 2004/0125790 | A1* | 7/2004 | Hiller et al. ............ 370/352 |
| 2004/0202117 | A1 | 10/2004 | Wilson et al. |
| 2004/0203907 | A1* | 10/2004 | Hiller et al. ............ 455/519 |
| 2004/0224710 | A1* | 11/2004 | Koskelainen et al. ...... 455/518 |
| 2005/0027802 | A1* | 2/2005 | Madsen et al. |
| 2005/0136952 | A1* | 6/2005 | Zabawskyj et al. ........ 455/466 |
| 2005/0207557 | A1* | 9/2005 | Dolan et al. |
| 2006/0167944 | A1 | 7/2006 | Baker |

FOREIGN PATENT DOCUMENTS

| | | |
|---|---|---|
| CN | 1401102 A | 3/2003 |
| EP | 1154666 | 11/2001 |
| JP | 10154117 | 6/1998 |
| JP | 11203227 | 7/1999 |
| JP | 11249990 | 9/1999 |
| JP | 2002009819 | 1/2002 |
| KR | 2001-0103278 | 11/2001 |
| WO | 2000/69140 | 11/2000 |
| WO | 2001/63512 | 8/2001 |

OTHER PUBLICATIONS

PCT International Search Report PCT/US03/22357, May 4, 2004, 3 pgs.

Supplementary European Search Report, EP Appl No. EP03764784, Jun. 16, 2006, 3 pgs.

PCT International Search Report and Written Opinion, Dec. 7, 2005, PCT/US04/43581, 7 pgs.

PCT International Search Report, PCT/US03/22355, 4 pgs, Sep. 26, 2003.

* cited by examiner

METHOD, SYSTEM AND APPARATUS FOR MESSAGING BETWEEN WIRELESS MOBILE TERMINALS AND NETWORKED COMPUTERS

CROSS-REFERENCE RELATED APPLICATIONS

This application is a continuation of U.S. patent application Ser. No. 10/748,723 filed Dec. 30, 2003, now U.S. Pat. No. 7,640,293 issued Dec. 29, 2009, which is a continuation-in-part of U.S. patent application Ser. No. 10/245,918 filed Sep. 18, 2002, now U.S. Pat. No. 7,072,941 issued Jul. 4, 2006, which is a continuation-in-part of U.S. patent application Ser. No. 10/197,022 filed Jul. 17, 2002, all of which are hereby incorporated herein in their entireties by reference.

TECHNICAL FIELD

The present invention relates generally to communications systems, and in particular, to a communications system and method that permits wireless instant messaging.

BACKGROUND

Messaging systems are known that provide instant, real-time communications between users connected through online or electronic network environments. Examples of online instant messaging (IM) systems include Yahoo!® Messenger and AOL Instant Messenger$^{SM}$. These systems are becoming increasingly popular among Internet and world-wide web users because they are easy to use and provide a simple way for one user to instantly send a message to another user. However, these systems do not allow users to send voice messages to users on external systems, such as cellular telephone networks.

U.S. Pat. No. 6,430,604 discloses an IM system that is capable of sending messages between users of online and cellular systems. In the '604 system, a separate IM system is provided. The IM system is able to detect which users are logged on. For users not logged on, the IM system provides alternative delivery mechanisms, such as cellular phones, pagers and email. The '604 system transforms its messages for delivery on these external systems when a user is not logged in. Although the '604 system represents an advancement over traditional online IM systems, it does not provide a universal IM service that seamlessly interoperates over different wireless carriers or between cellular handsets and personal computers.

Known IM systems provide real-time awareness of who is logged on to the system. Typically, an IM system user has an address book containing names and/or nicknames for those people with whom he/she communicates. The entries in the address book are used for selecting a message recipient. For a message to be sent instantly from a sender to a recipient, both users must be currently logged onto the IM system. Known IM systems do not store messages for later delivery for each of the intended recipients is not logged onto the IM system.

Some IM systems permit one-to-many message broadcasts. One-to-many broadcasts allow a sender to simultaneously transmit a message to more than one recipient. One-to-many message broadcasting has been used for decades by other types of two-way communication systems, namely, in two-way radio systems, e.g., walkie-talkies, citizen band (CB) radios, and radios used by police and fire departments. In these earlier communication systems, multiple users were required to use the same frequency and would inherently broadcast messages to all of the other users on a channel (one-to many messaging). To facilitate the orderly use of the radio channel, push-to-talk (PTT) communication schemes were devised.

A conventional PTT system has multiple radios, all tuned to the same channel (i.e. the same frequency). Any user who wishes to speak pushes a button on his/her radio, causing his/her radio to transmit to the other radios. Releasing the button causes the sending radio to release the channel for use by the other user. Any number of users may share the same frequency, provided that there is some way to arbitrate the channel usage.

Single channel PTT systems evolved into trunked radio systems. In a trunked radio system, instead of sharing a single physical channel, the users share a common logical channel. A user who wishes to start a conversation broadcasts a signal to a controller requesting such a start. The controller receives this signal and broadcasts back a signal to other users, which allocates a physical channel. The other user radios then automatically re-tune to allocate a frequency and the conversation continues using PTT messages. Whenever there is a pause in the conversation, the controller can allocate a new physical channel. The trunked radio system was an improvement over the single channel system because it could re-allocate physical channels based on traffic patterns, signal quality and the like.

Over the course of decades, PTT messaging has become a customary and familiar way of communication for many people. Consequently, PTT functionality has recently appeared in other types of communication systems. For example, Nextel is currently offering PTT services to its cellular customers. As a further example, U.S. Pat. No. 6,360,093 describes a communication system that permits PTT messaging between digital cellular handsets and networked computers. The '093 system digitizes voice messages and transmits them as streaming voice data messages to users. Although the '093 system and Nextel services present useful applications of PTT messaging, they do not extend PTT functionality into voice/text instant messaging environments. Nor do they address the need to provide seamless PIT functionality and instant messaging between users on different wireless carrier networks.

Accordingly, there is a need for an improved communication system that allows seamless instant messaging with PTT functionality.

SUMMARY

It is an advantage of the present invention to provide an improved messaging system that permits inter-carrier instant messaging (IM) with push-to-talk functionality, as well as push-to-talk IM between wireless mobile terminals and networked computers.

According to an embodiment of the invention, a messaging system includes one or more wireless mobile terminals operating on a wireless carrier network, one or more networked computer and a server. The mobile terminals and computers include client applications for communicating messages to one another using push-to-talk modality. The server, located on a packet network outside the wireless carrier networks, forwards messages between the mobile terminals and computers. The messages consist of text or streaming voice. By placing the server outside wireless carrier network and by using a conventional packet network protocol, the system provides seamless inter-carrier push-to-talk and/or instant messaging between mobile terminals, networked computers, and users of third-party email and IM services. In accordance with one aspect of this embodiment, the server can also include gateways for forwarding messages from the mobile terminals and computers to external email and (IM) users.

In accordance with another embodiment of the invention, a server includes a router for communicating with a wireless mobile terminal and a networked computer. The wireless mobile terminal operates over a wireless carrier network, while the networked computer operates on a packet network. An application running on the server forwards messages between the wireless mobile terminal and networked computer, where the messages include text and/or streaming voice.

In accordance with a further embodiment of the invention, a computer program product stored on a computer-readable medium permits messaging between a wireless mobile terminal operating on a wireless carrier network and a networked computer on a packet network. The computer program includes executable code for establishing a communication session with a networked server. The server communicates messages between the wireless mobile terminal and networked computer. The computer program also includes code for presenting user interfaces for composing text messages, for recording voice messages, and for selecting one or more message recipients, where the message recipients include the wireless mobile terminal or networked computer. The program further includes code for sending the voice and text messages to the server for delivery to the message recipients.

In accordance with yet another embodiment of the invention, a wireless mobile terminal capable of operating on a wireless carrier network is provided. The mobile terminal includes a memory for storing program code, a processor for executing the program code, and the program code, which is stored in the memory. The program code causes the mobile terminal to establish a communication session with a server capable of forwarding messages to a networked computer by way of a packet network. The program code also permits a user to record a voice message, select the networked computer as the message recipient, and send the voice message as streaming voice to the server for delivery to the networked computer.

Method counterparts to these embodiments are also disclosed. Other embodiments, systems, methods, features and advantages of the invention will be or will become apparent to one with skill in the art upon examination of the following figures to and detailed description. It is intended that all such additional embodiments, systems, methods, features and advantages be included within the scope of the invention, and be protected by the accompanying claims.

BRIEF DESCRIPTION OF THE DRAWINGS

The components in the figures are not necessarily to scale, emphasis instead being placed upon illustrating the principles of the invention.

DETAILED DESCRIPTION

Figure 1:
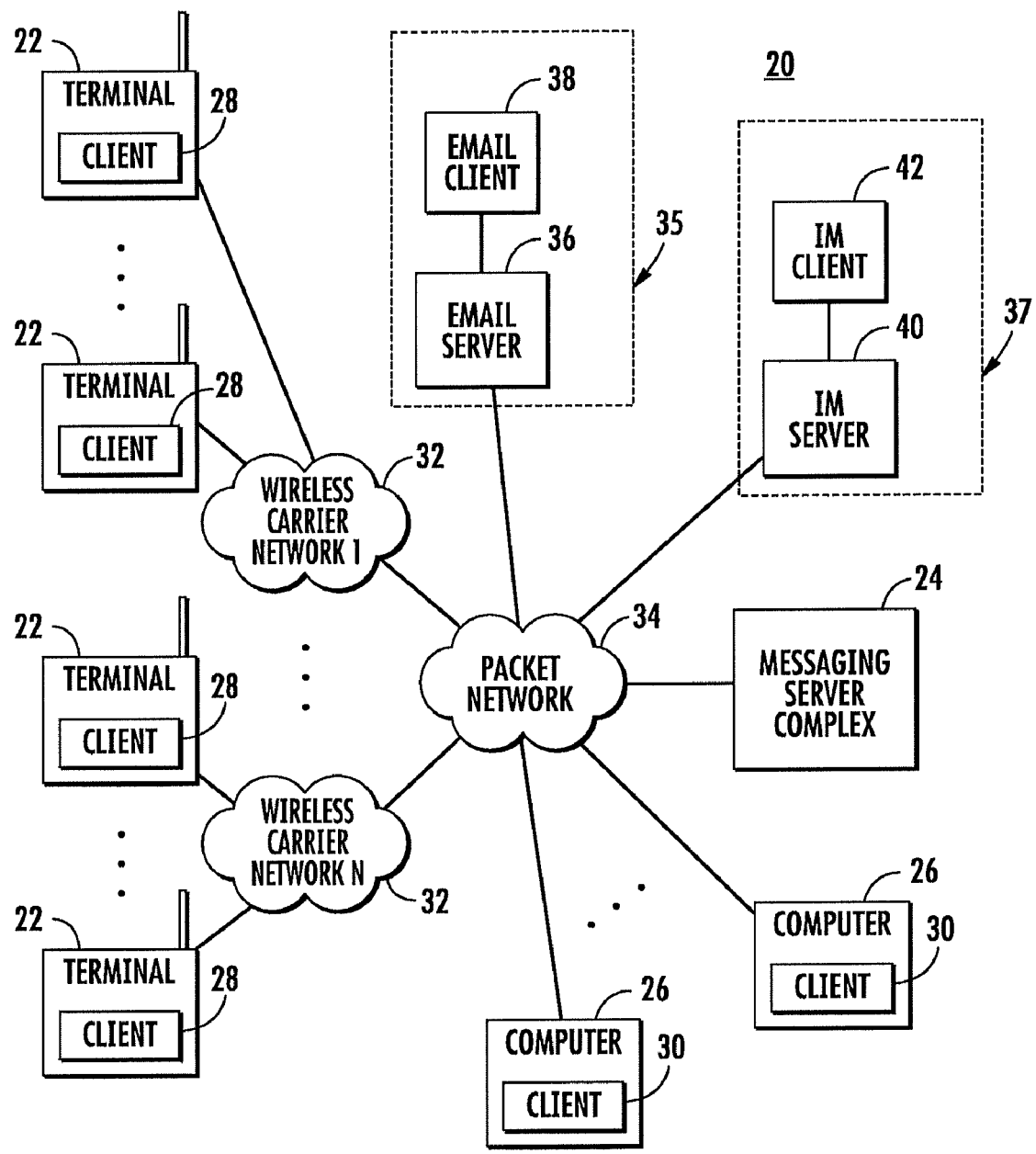
FIG. 1 is a block diagram of an exemplary communications system in accordance with an embodiment of the present invention.

FIG. 1 illustrates the overall system architecture of a wireless communication system 20 comprising a plurality of mobile terminals 22 capable of instance messaging with one or more networked computers 26 in accordance with an embodiment of the present invention. The terminals 22 each include a client software application 28 for communicating with at least one messaging server complex 24 by wirelessly transmitting data through a corresponding wireless carrier's infrastructure 32. As known in the art, the wireless carrier infrastructures 32 comprise those elements necessary to support wireless communications with the terminals 22. Various service providers (such as Verizon or Sprint in the U.S., or Orange in Europe) build and maintain such infrastructures.

Each of the plurality of wireless operators may deploy different wireless data technology in the wireless carrier network 32, such as Global System for Mobile Communication's (GSM) General Packet Radio Service (GPRS) and Code-Division Multiple Access's (CDMA) Single Carrier Radio Transmission Technology (1xRTT). In this respect, the systems disclosed herein do not depend on the data wireless technology employed.

The data packets are sent on to a communication network 34 that forwards them onto the server complex 24. The communication network 34, which is a packet-based network, may comprise a public network such as the Internet or World Wide Web, a private network such as a corporate intranet, or some combination of public and private network elements. The server complex 24 preferably comprises a plurality of networked server computers that are programmed to implement the functionality described herein. The particular number of servers used and the manner in which they communicate with each other is a matter of design choice. Techniques for programming server computers and mobile terminals are well known in the art.

The networked computer 26 communicates with the messaging server complex 24 over the communication network 34. Messages between the mobile terminals 22 and the computer 26 pass through and are processed by the server complex 24.

The networked computer 26 can be any type of computer, and is preferably a commercially available personal computer (PC) having a network interface card (not shown) and an operating system, such as Windows®, that permit data packet communications using conventional protocols such as TCP/IP or UDP/IP. The computer 26 includes a messaging application client 30 that provides the instant messaging and PTT functionality described herein.

The messaging service provided by the system 20 is also capable of forwarding messages to users on external systems, such as external email service 35 and external IM service 37. These external services are provided by third parties, such as America Online and/or the Microsoft Network. As discussed in further detail below, the server complex 24 includes gateways 313,315 for proxy logins to the external servers 36,40 to forward messages from the terminals 22 and computer 26 to external email clients 38 and IM clients 42.

When the server complex 24 communicates with one or more mobile terminals 22, the server complex 24 sends its data to the network 34 that, in turn, forwards the data onto at least one of the carrier infrastructures 32. Each relevant carrier infrastructure 32 then transmits the data to one or more of its corresponding mobile terminals 22. When a user sends messages (i.e., sends messages from one terminal 22 to another), data comprising text, audio (including real-time speech, pre-recorded speech, music, etc.), and/or graphical messages (or some combination thereof) are sent to the server complex 24. The server complex 24 then sends copies of the message out to the targeted terminals 22 and/or computer 26, including, in one embodiment, the initiating or sending terminal as well as other IM and email clients 42,38.

The server complex 24 can be placed inside a wireless carrier's infrastructure 32. Furthermore, the present invention would benefit systems other than packet data based systems, as well as systems that are limited in scope to a single wireless carrier's domain.

Preferably, the server complex 24 resides outside the carrier's domain. As such, it is able to service mobile terminals 22 that are associated with different wireless carriers. In effect, the systems disclosed herein are independent of the wireless operators. They do not require any special hardware or software to be placed within the operator wireless network 32. The wireless operator's network 32 (in conjunction with a public network 34) acts as a communication pipe between the mobile terminal 22 and the server complex 24. Preferably, standard packet data transfer protocols are used to transmit and route data messages back and forth between the mobile terminal 22 and the server complex 24, such as the Internet Protocol (IP), Transmission Control Protocol (TCP), User Datagram Protocol (UDP), and World Wide Web protocols, such as the Hypertext Transfer Protocol (HTTP). The server complex 24 includes one or more gateways between the various transfer protocols. Each of the plurality of mobile terminals 22 establishes a connection with the server complex 24 using a suitable transfer protocol. Messages flow from the mobile terminal 22 into the server complex 24 over at least one protocol. The server complex 24 copies the message's content and broadcasts it to other intended recipient mobile terminals 22 using the appropriate transfer protocol suitable for each of the targeted mobile terminals 22.

Figure 2A:
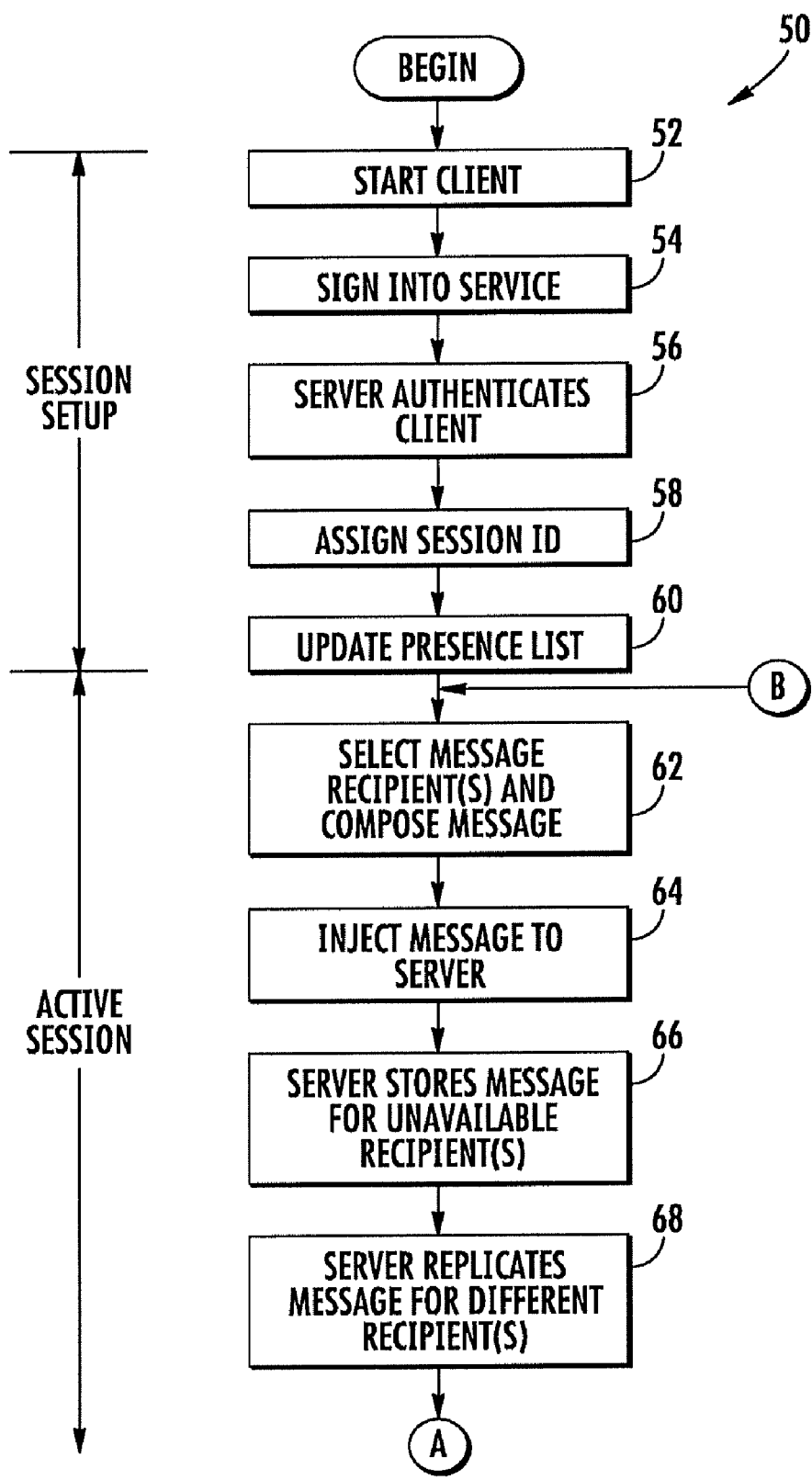
FIGS. 2A-B show a flowchart of a method of messaging in the communication system of FIG. 1 in accordance with a further embodiment of the present invention.
Figure 2B:
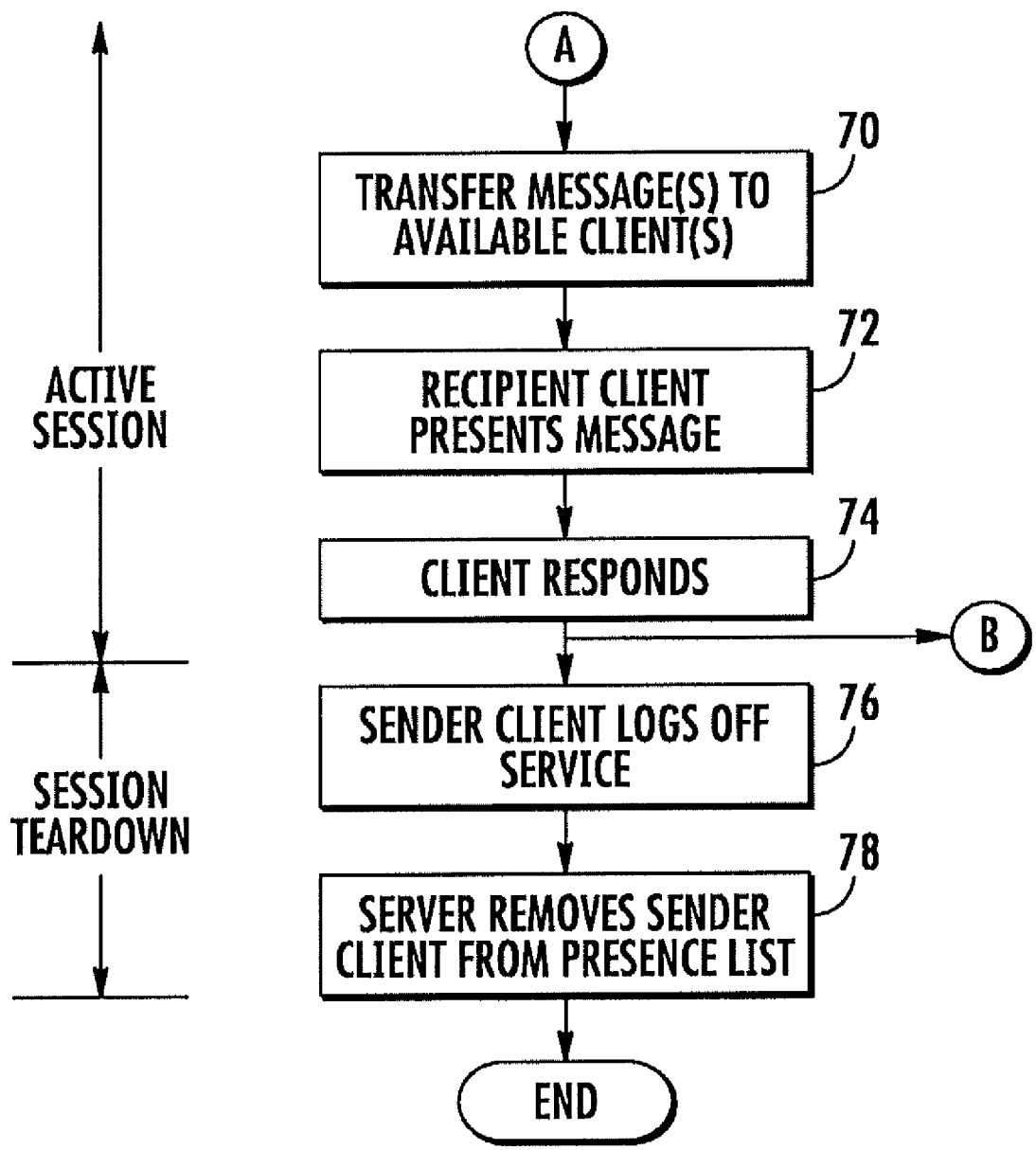

FIGS. 2A-B show a flowchart 50 of a method of messaging within the communication system 20 in accordance with a further embodiment of the present invention. The method entails a sequence of three phases: messaging session setup, active messaging, and messaging session teardown.

In step 52, a messaging client 28, 30 is started at either one of the wireless terminals 22 or the computer 26. The client 28, 30 instantiates a graphical user interface (GUI) at the respective user device for allowing the end user to compose, send and receive audio and text messages in a real-time fashion.

In step 54, the client 28,30 requests user sign-in information, such as a user ID and/or password. Upon user entry of this information, the client 28,30 forwards the sign-in information to the server complex 24 for authentication (step 56). This is done using the connection request/response messages shown in FIGS. 5A-B. If the user is successfully authenticated and has sufficient privileges, the server complex 24 assigns a session ID (step 58). The session ID is used within the server complex 24 to establish and maintain a messaging session for the user. The session ID includes a label associated with other information, such as the identity and address of the user and user device initiating the session, as well as timer and counter data for keeping the session alive.

In step 60, the server complex 24 updates an internal presence list to indicate that the user is actively logged on to the system 20. This list is periodically transmitted to other clients 28,30 in the system so that other users are alerted to the presence of the newly logged on user by updates to their displayed buddy lists. At this point, an active messaging session is established for the user.

In step 62, the user selects one or message recipients and composes a message using the GUI of the messaging client 28,30. The message can be text or voice. The user interface for selecting and storing lists of recipients, as well as writing and recording messages, is described in detail below.

In step 64, the message is sent from the user device 22,26 to the server complex 24 over the packet network 34. Voice messages are sent as packets of streaming voice. The message includes, among other things, information identifying the session and the intended recipients In step 66, the server complex 24 checks the presence list to determine which recipients are currently logged into the system. The server complex 24 stores messages for unavailable recipients for later delivery, when the recipient logs in to the messaging service.

In step 68, the server complex 24 replicates the message for delivery to the different recipients. The server complex 24 then transfers the message to available recipient clients over the packet network 34 and wireless carrier networks 32, where applicable. To forward the message to external email or IM clients 38,42, the server complex 24 uses email and IM gateways 315,313 to login to the respective external system 35,37 on behalf of the message sender using the message sender's external service login user ID and password. This login information for the sender is stored by the server complex 24. The message is then forwarded to the external client 38,42 using the sender's external service account.

Figure 4:
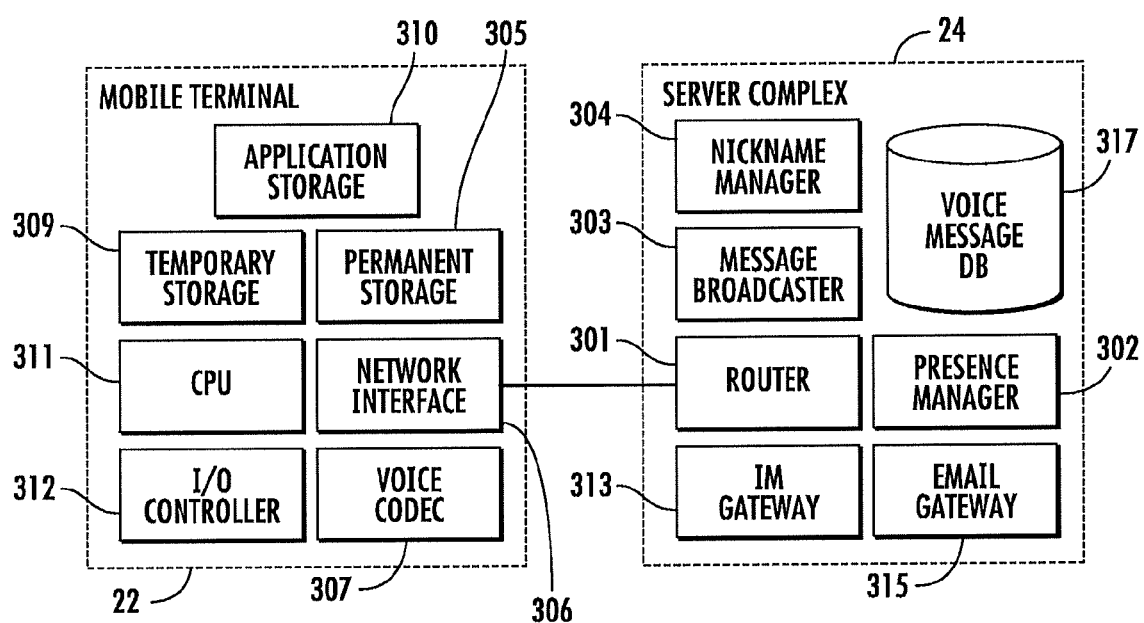
FIG. 4 is a more detailed block diagram of communication components included in the system of FIG. 1.

If the message is a voice message delivered to an external email or IM service 35,37 the server complex 24 transcodes the digitized voice message to a format suitable for networked computers, stores the resulting digitized voice message in a voice message database 317 (see FIG. 4). The stored voice message is assigned a Universal Resource Locator (URL), and the URL is sent to the external client 38,42, imbedded in a text message instead of the digitized voice content. The external client 38,42 can then open a local web browser application to access and playback the voice message using an appropriate multimedia plugin.

In step 72, the recipient clients then present the message, by either displaying the text or playing the voice message. In step 74, the recipient clients can respond with their own messages in similar fashion, by repeating steps 62-72. The real-time messaging conversation can continue until the participants decide to terminate it.

To teardown the messaging session, the sender client 28,30 sends a logoff message to the server complex 24 (step 76). In response, the server complex 24 discards the session ID and updates the presence to offline on all the clients currently logged in that subscribe to the client's presence updates. The server complex 24 discontinues forwarding messages until the user again logs on.

The session ID is useful for other purposes in the system 20. The quality characteristics of connections over wireless data networks can change with time. For example, a mobile user can move into a no coverage area where the data connection is dropped. The connection can be re-established later when coverage is available again, however, in the process the mobile terminal 22 may acquire a new IP address. Consequently, the server complex 24 is left unable to forward messages to the mobile terminal 22. To deal with this, the system disclosed herein uses a session identifier to describe the connection between a particular mobile terminal 22 and the server complex 24. Whenever a mobile terminal re-establishes a connection (after losing it due to loss of coverage, as an example) the mobile terminal 22 re-uses the session ID of the interrupted session. The server complex 24 then rebinds the new connection to the existing session. If the mobile terminal 22 does not reconnect within a given timeout period, the server complex 24 can terminate the session. Other events causing a disconnection can include a lost session termination command sent from the mobile terminal 22, improper shut down of the application at the mobile terminal 22, battery failure, session timer timeouts, unrecoverable errors, and the like.

Preferably, all routing that occurs within (or among) server complexes 24 is done using the session IDs. A session ID is preferably used instead of a client ID because a user may choose to terminate a session and establish another. In this manner, all messages bound to the terminated session may be removed from the system. Only transactions associated the active sessions are maintained. Also, in a distributed server complex 24 environment where there are many message broadcasters 303 (i.e. physical server hosts), the client may attach to different hosts servers. Using session IDs provides a simple means to find where the client is currently connected. In addition, on re-establishing a connection, the server complex 24 can use what is commonly known in the art as sticky load-balancing switches that direct a re-connecting client to physically re-establish its connection with its previous host server based on the session ID (even in cases where the IP address of the mobile terminal 22 may have changed.)

To permit instant messaging between different carrier networks 32 over the communication network 34, a keep alive scheme is employed. Some wireless operator networks do not allow unsolicited network-initiated messages to reach their mobile terminals 22. Network-initiated messages, as they pertains to the system 20 described herein are messages going from the server complex 24 toward the mobile terminal 22 that appear to the network operator as if it was unsolicited by the mobile terminal 22. This is a problem in instant messaging environments since a message broadcaster 303 commonly sends unsolicited inbound messages 500 to the recipients of a message. To overcome this, the system 20 uses keep-alive strategies. These strategies vary depending on the data transfer protocol established between the particular mobile terminal 22 and the server complex 24. The keep-alive strategies involve periodically sending a message from the mobile terminal 22 to the server complex 24. The keep-alive message appears to the mobile network as a request. Subsequent messages sent back to the mobile terminal 22 can then be considered by the operator as responses to requests as long as the messages sent to the mobile terminal 22 originate from the same address the mobile terminal 22 sent the keep alive message to. The frequency of the keep-alive messages is a matter of design choice and transfer protocol used. When HTTP is used as the transfer protocol, the system uses a polling mechanism. Using this mechanism, the keep-alive message is sent frequently and acts as a poll to determine if there are any pending messages at the server complex. If there are pending messages, those messages are sent back as a response to the polling request. TCP and or UDP do not require a polling mechanism and can use keep-alive techniques, such as simply sending at least the session ID in a message to the server complex 24 with a significantly longer time between messages. Sending keep-alive messages may be optimized. For instance, the keep-alive messages do not have to be sent when outbound messages 400 have been recently sent from the mobile terminal 22 to the server complex 24.

Preferably, all messages sent to the mobile terminal 22 from the server complex 24 go through the same router and possibly the same physical host server that the mobile terminal 22 attaches to in the server complex 24. This ensures that the operators can treat the messages as responses to a mobile terminal's 22 requests. Other techniques to make traffic appear to originate from the same location, such as address mapping and the like can also be used by the system.

In addition, keep-alive messages work in conjunction with other techniques described above to inform the server complex 24 if the address of the mobile terminal has changed. This is especially useful in cases where UDP is used as the transport protocol. On every keep-alive message sent, the server complex 24 notes the address of the mobile terminal 22. If the address changed, the server complex 24 then rebinds the session ID to the new address. As such, the keep-alive message may still benefit the system even if the operator does not block network-initiated messages.

It is possible that the server complex 24 is unable to deliver a message to a mobile terminal 22 because it doesn't have the most up-to-date address—the address of the mobile terminal 22 may have changed before a keep-alive message is sent. In this situation, the system may, for example, hold on to the undelivered message for a period until the next keep-alive message arrives; it may drop the message and inform the sender that it failed to send the message; or it may send the message using some out-of-band mechanism, or it may store the message for later delivery.

A problem in some currently deployed wireless packet data networks is communication channel resource contention. While a wireless data connection is established, some systems (e.g., CDMA's 1xRTT) can loose the capability to route telephony calls and other wireless related services to the mobile terminals 22. As such, the keep-alive strategy used by the system described above can become problematic. To solve this problem, the preferred embodiment uses a back-off strategy that is based on predicting the user's involvement in the messaging service described herein. The back-off strategy uses a dynamic timeout scheme. For example, when the mobile terminal 22 is presenting a conversation display where there are active updates (i.e., inbound messages 500) and the likelihood of participation is high, the length of timeout is significantly longer than when there are no updates or when the mobile terminal 22 is presenting a buddy list display and the likelihood of participation is lower. The purpose of the timeout is to guard against cases where the user might have forgotten or otherwise inadvertently left the messaging application 28 running, whereby preventing any incoming telephony calls or other communications from reaching the user. When a timeout occurs, the user is given the opportunity to continue the session. A prompt notifying the user that the connection between the mobile terminal 22 and the server complex 24 is about to be severed. The user can choose to cancel the action and keep the connection alive. Otherwise, if the user doesn't cancel within the allotted time to respond, the connection is automatically terminated. When the mobile terminal is disconnected, it can no longer receive instant messages through the previously established packet data connections.

Alternative disconnect schemes can be used. For example, the messaging program 28 running on the mobile terminal 22 may choose to periodically reconnect with the server complex 24 to see if there are any messages pending delivery. If not, the program 28 on the mobile unit 22 may automatically disconnect. Otherwise, the messages are delivered and the program updates the history display (as described below) and resumes operations until either the user terminates the session or a session timer timeout occurs.

Figure 3:
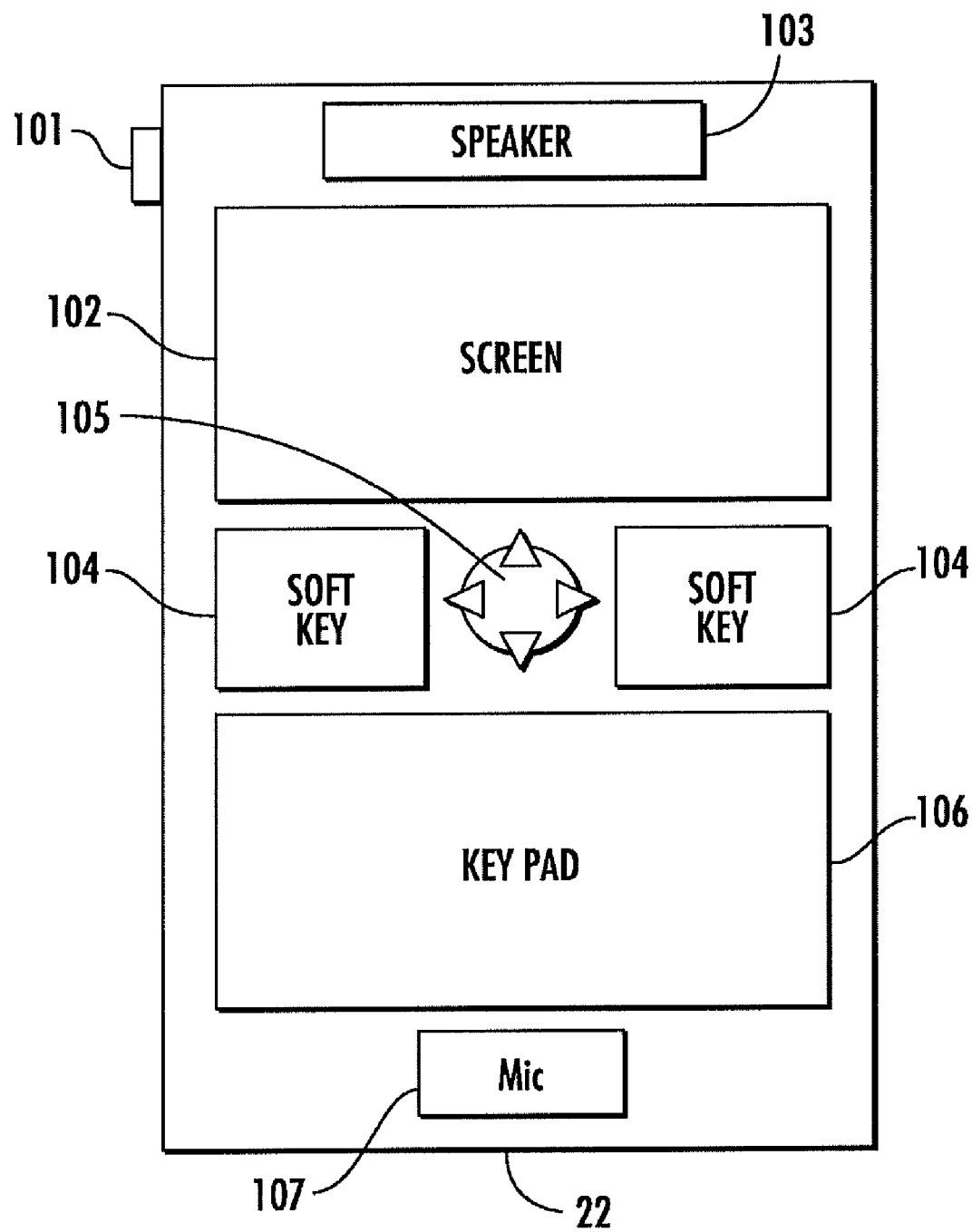
FIG. 3 is a schematic illustration of a wireless mobile terminal usable in the system of FIG. 1.

FIG. 3 illustrates a wireless mobile terminal 22 that may comprise any wireless communication device such as a handheld cellular phone or a wirelessly enabled Personal Digital Assistant (PDA). The configuration of the mobile terminal 22 shown in FIG. 3 is exemplary only, and it is generally understood that a variety of terminals and terminal configurations could be used. As shown, the mobile terminal 22 comprises a speaker 103 for rendering signals, such as received speech, audible; a display 102 to render text and graphical elements visible; a navigation rocker 105 that allows a user to navigate a list or menu displayed on the screen; programmable buttons (or "softkeys") 104; a keypad 106 that allows the user to input digits, letters, and other symbols (e.g., punctuation); a microphone 107 that captures audio such as the user's speech; and a push-to-talk button 101 that allows the user to initiate recording and transmission of audio. These and other components of the mobile terminal (not shown) are well known in the art. Additionally, there are a variety of styles and instances of components that can be used instead of (or in conjunction with) the components described in FIG. 3. For example, the push-to-talk button 101 may be omitted and replaced with automatic voice detection mechanisms or softkeys. Touch screens and hand writing recognition techniques can replace the need for the softkeys 104, the navigation rocker 105, and the keypad 106. The present invention is not limited in this regard. Additional components of the terminal that are not necessarily visible to the user but are necessary to implement messaging functionality are further described with reference to FIG. 4. The input devices available on the wireless mobile terminal (e.g., keypad, softkeys, etc.) may be employed by a user of the wireless mobile terminal to initiate a session of the messaging client software 28 and, within the operation of the software, to initiate one or more message broadcasts.

Each of the mobile terminals includes a display screen 102 capable of presenting message text, a graphical user interface, and other information. The terminals execute the messaging client application 28 that provides messaging services over the wireless carrier networks 32. Mobile terminals 22 running the client 28 are capable of displaying a conversation thread that is updated in or near real-time so that messages in the conversation progressively scroll on the screen. In addition, the client 28 allows a mobile terminal 22 to present a text edit area on a portion of its screen while concurrently showing the conversation on another portion of the screen 102. This is discussed in further detail in connection with FIGS. 13-14. A text editor resident in the mobile terminal 22 permits a user to compose a message in the text edit area while simultaneously viewing the conversation as it progresses. The composed message can be a response to the conversation currently being displayed.

FIG. 4 illustrates in more detail components found in both the terminals 22 and the server complex 24 used to exchange speech and text messages. Focusing on the components of the terminal 22, machine-readable and executable instructions (typically referred to as software, code, or program) for the messaging client 28 are preferably stored in an application storage (or memory) 310 and executed (or run) on a central processing unit (CPU) 211. All storage devices described herein may comprise any suitable combination of volatile (e.g., random access memory) or non-volatile (e.g., read-only memory) storage. Likewise, the CPU 211 may comprise a microprocessor, microcontroller, digital signal processor, coprocessor, similar devices or combinations thereof. Using known programming techniques, the software can manipulate the display 102, capture speech from the microphone 107, capture input data from the key pad 106, navigation rocker 105, soft keys 104 and/or push-to-talk button 101 using the I/O controller 312. Outbound messages sent to the server complex 24, as well as those inbound messages received from the server complex 24, pass through the network interface 306 that provides connectivity between the terminal and the data network.

Where the terminal 22 comprises a wireless device, the network interface 306 comprises the entire physical interface necessary to communicate with the server complex 24, including a wireless transceiver.

Preferably, but not necessarily, speech sent to the server complex 24 is first encoded using a voice codec 307, which may be implemented in software, but is preferably implemented using a combination of hardware and software components. Similarly, voice from the server complex 24, may, when necessary, be decoded using the voice codec 307 before it is sent to the speaker 103. The software uses temporary storage 309 to save working data that does not persist between software initiations (sessions). On the other hand, the software uses the permanent storage 305 to persist data for longer periods of time that can span multiple software sessions.

Focusing on components of the server complex 24, the data traffic comprising encoded speech and text messages (e.g., outbound messages 400; see FIG. 6A) flows into the server complex 24 preferably via the router 301. Note that the router 301, presence manager 302, message broadcaster 303 and nickname manager 304 may be implemented on one or more server computers or the like residing within the server complex 24. The router 301 directs the outbound message 400 towards a message broadcaster 303 that determines the plurality of inbound message copies (e.g., inbound messages 500; see FIG. 6B) needed and their destinations. In the context of the present disclosure, the term inbound refers to messages directed from the server complex 24 to one or more mobile terminals 22, computers 26, or external services 36, 40; whereas the term outbound refers to messages sent from mobile terminals 22, computers 26, or external services 36, 40 to the server complex 24.

The message broadcaster 303 decomposes the incoming message 400, and locates the list of recipient identifiers 402. It then queries a presence manager 302 to establish the recipients' current status 702 (i.e., an indicator of whether the recipient is ready to receive the particular type of message, speech and/or text messages only, etc.) and the terminal's address 703.

Figure 8:
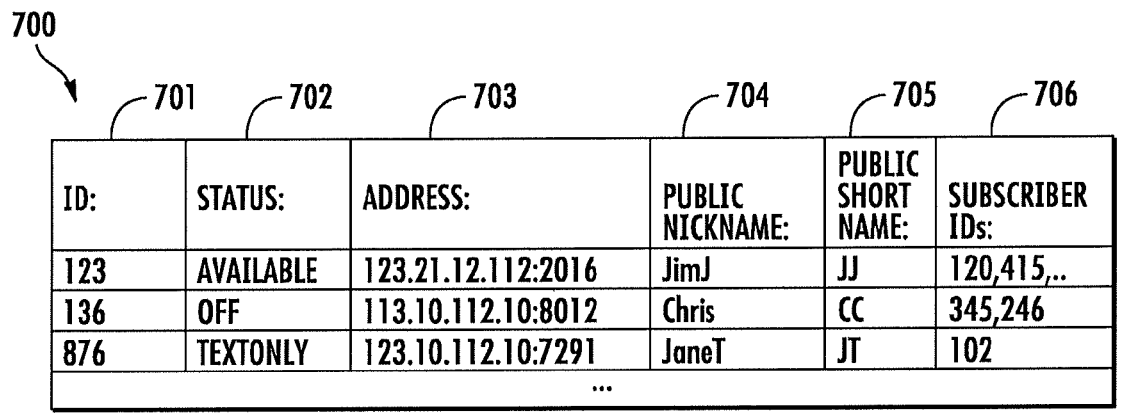
FIG. 8 is a table that illustrates the data contained in the presence manager shown in FIG. 4.

FIG. 8 illustrates a table with the plurality of presence data records 700 contained within the presence manager 303. Each presence record 700, comprises the user's identifier 701, the current status 702, the current terminal address 703 (if known), a public display identifier, such as a public nickname 704 and a public short name 705, and a plurality of other user identifiers 706 that subscribe to the presence information of the user corresponding to that record. The public display identifiers or public nickname set 704-705 is used in inbound messages 500 sent to the terminal 22 unless the receiver (i.e., the receiving user) overrides the public nickname set 704-705 with private display identifiers or a private nickname set 802-803. When presence status 702 changes, the presence manager 302 sends a buddy list update message 600 to all the subscribers listed in the subscriber identifier field 706 of the corresponding presence record 700. The presence records 700 may contain other information and attributes such as forwarding address, processing rules that describe what to do in various circumstances, graphical representation for various status, profiles (i.e., a plurality of a different value sets that could be used at various times or depending on the receiver, etc.) and the like.

Although not illustrated in FIG. 4, the server complex 24 may include other components such as authentication and encryption servers that ensure the authenticity of the communication messages and secure the privacy of their content. The server complex 24 may also include a plurality of other components like speech-to-text and text-to-speech translators, natural language translators, voice transcoders, and other similar transformation gateways that transform the message, its contents, and any attachments (e.g., multimedia attachments such ring-tones, images, videos, audio, and the like) to a more meaningful and usable format by the receiver. Techniques for implementing such other components are well known in the art.

The voice codec 307 used on the mobile terminals 22 can be native to the terminals. The voice codec 307 native to the mobile terminal 22 is optimized for both the terminal's processing strategy and the wireless technologies used. In order for the system to be independent of the underlying wireless technology, the system 20 uses commercially-available media gateways (not shown) included in the server complex 24. The media gateways transcode speech samples from one encoding to another. In operation, the message broadcaster 303 establishes the type of encoding used on the incoming message. It determines the type of encoding required for the each of the plurality of target mobile terminals 22. For each copy of the message, the message broadcaster 303 uses at least one media gateway to transcode the speech to a coding scheme appropriate of the target recipient. Techniques for detecting the type of encoding used by the incoming message and or required by the target terminals, as well as interfacing to media gateways are known in the art. Exception processing in cases where the media gateway is unable to fulfill a conversion can also be performed by the system. For example, a message may be sent back to the sender informing the sender that the message was not delivered to the target recipient because the system does not support the required transcoding techniques.

In addition, the system can be configured to optimize transcoding. For example, the message broadcaster 303 can reuse the same transcoding for all messages targeting mobile terminals 22 that require the same encoding. The message broadcaster 303 can avoid transcoding the speech if it detects that the message cannot be otherwise delivered to a target. Other optimization techniques can be employed as well.

To reduce the amount of transcoding, the mobile terminals 22 can be grouped and allocated among a plurality of server complexes 24. As such, each server complex 24 services a set of homogeneous mobile terminals 22 requiring the same speech encoding. Multiple server complexes 24 may use the same encoding. When a message reaches the message broadcaster 303 of one of the server complexes 24, the broadcaster forwards at least a copy of the message to another server complex 24 managing the connection with a subset of the intended recipients of the message. The message forwarded is transcoded by a media gateway in route between the two server complexes 24. The system benefits from using a common encoding for transferring the speech sample between the various server complexes 24. In particular, the message that is received by a server complex 24, is transcoded into the common encoding before it is forwarded to the plurality of other target server complexes 24 (only one transcoding is required in this case).

Upon arrival of the message into each of the plurality of target server complexes 24, the message is converted into the encoding that is suitable for the target mobile terminal 22. Only one encoding at the end server complex is needed since all the terminals serviced by the complex use the same encoding. Messages not forwarded outside the server complex 24 need no transcoding since all the mobile terminals serviced by the complex use the same encoding.

In this arrangement, simpler media gateways may be deployed between the complexes 24 because the gateways only need to transcode content between the common encoding and the encoding used by the mobile terminals 22 serviced by the complex 24. Also, detection of the type of transcoding required is inherent in the routing of messages i.e., structure and distribution of mobile terminals and does not required actual resolution based on any encoding information itself. It is done based only on the target address of the mobile terminal, which is resolved in all cases to route and direct messages. For example, instead of using multiple server complexes 24, a single server complex 24 can be subdivided where a plurality of message broadcasters 303 are used in the same spirit as distributed server complexes 24. The invention is not limited to any particular arrangement of server complexes, such as those discussed above. Alternative arrangements can be employed for the server complex 24.

The nickname manager 304 in the server complex 24 is responsible for managing lists of nickname sets 802-803 used by the receiver of an inbound message 500 to override public nicknames and short names. Nicknames and short names differ primarily in their length. Nicknames may be of any arbitrary length whereas short names are preferably fixed in length or size. Additionally, nicknames and short names are instances of display identifiers used to identify the originators of messages. Such display identifiers are distinguished from identifiers used internally by the system to identify particular users (e.g., identifiers having reference numerals 701, 403, and 604). It should also be noted that short names might differ from nicknames in format or type. The system may use graphical, symbolic or other suitable forms of short names that are compact and fixed in dimension while using textual forms for nicknames. The system may vary the graphics and symbols based on context, user preferences, presentation themes and personalities.

Figure 9:
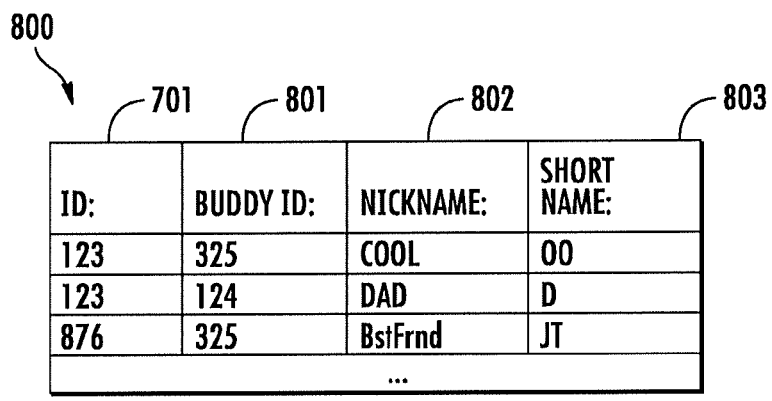
FIG. 9 is a table that illustrates the data contained in the nickname manager shown in FIG. 4.

FIG. 9 illustrates the nickname record 800 contained within the nickname manager 304. Preferably, each nickname record 800 comprises a receiving user's identifier 701, the buddy's identifier 801 (i.e., the identifier of the buddy for whom the receiving user desires the message broadcaster 303 to replace the buddy's public nickname set 704-705 with the receiver's private nickname set 802-803 on all inbound messages 500) and the private nickname 802 and private short name 803. Like the case of presence records 700, the nickname records 800 may contain other information and attributes such as forwarding address, processing rules, graphical representation for various status, profiles (i.e., different field values that could be used in various times, etc.) and so on. Upon receiving a message targeted to a recipient designated by the receiving user's identifier 701, the nickname manager 304 determines the buddy identifier 801 (i.e., the identification of the participant that initiated transmission of the message). Based on the buddy identifier 801, the nickname manager 304 inspects the nickname records corresponding to the targeted recipient. If the buddy identifier is not found in the targeted recipient's nickname records, the message is sent to the targeted recipient as in inbound message with the public nickname and public short name of the sender. In this case, the public nickname and/or short name of the sender will thereafter be displayed on the targeted recipient's mobile terminal display. If the buddy identifier is located in the targeted recipient's nickname records, the nickname manager determines the private nickname and private short name associated with the buddy's identifier and replaces the public nickname with the private nickname and the public short name with the private short name in the subsequent inbound message sent to the targeted recipient, thereby causing the private nickname and/or private short name to be displayed on the recipient's mobile terminal display. In this manner, users (i.e., recipients) have a greater degree of control over how conversation threads are displayed on their terminals. Note that the process of determining private display identifiers and substituting them for public display identifiers could be performed by the mobile terminals and computers assuming that the necessary nickname records are stored on the mobile terminals.

Figure 5A:
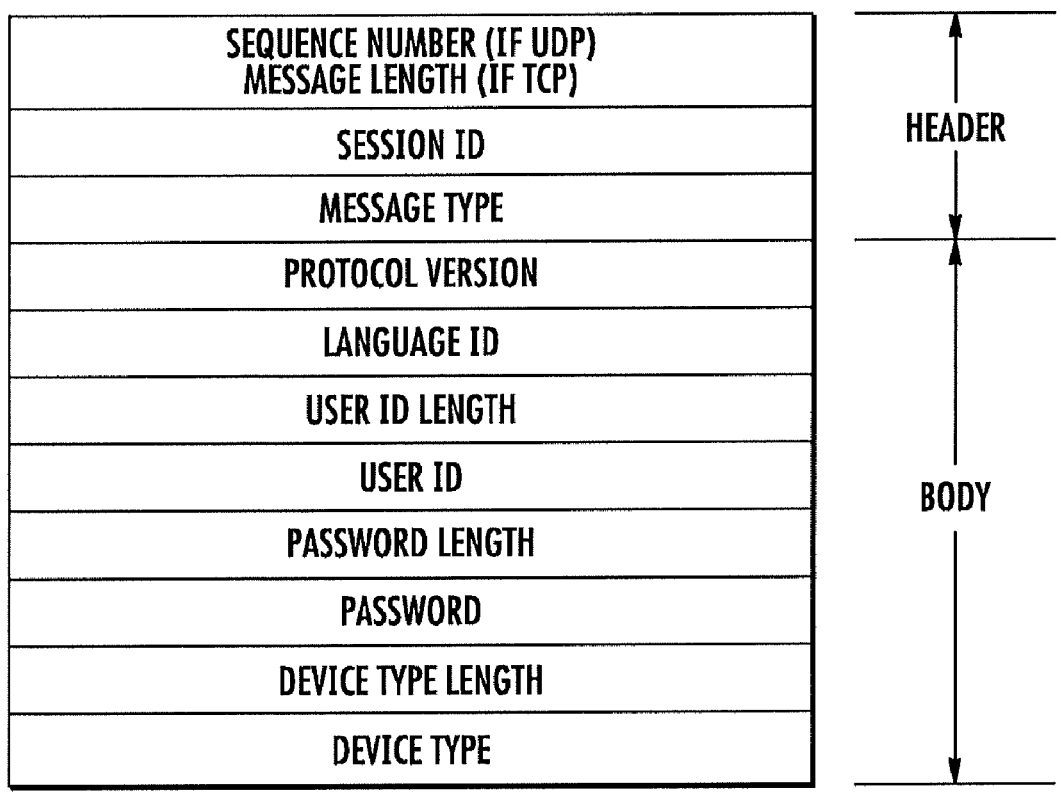
FIGS. 5A-B show inbound and outbound messages for establishing a connection between a client and the server complex of FIG. 1.

FIG. 5A illustrates an outbound client-to-server connection request message 450 that the terminal 22 or networked computer 26 sends to the server complex to establish a communication session. The protocol used between the clients and server complex is preferably UDP or TCP for all messages. Thus, the messages used by the system begin with a message TCP or UDP header. For simplicity the header is not shown in the definition of each message described herein. However, it is noted that the header includes a session ID. The session ID is a unique identifier that the server complex uses to identify a client. This allows for the client to change it's IP or port values and still be tracked by the server. This value is assigned by the server and exists for an entire session. The protocol expects all multi-byte fields to be in network byte order (most significant byte first).

Each message used by the protocol is identified by a message type, which is a string uniquely identifying the message.

The connect request message 450 is used by a client to initiate a session with the server complex. This packet has special properties that depend on the transport type. For UDP, the SEQUENCE_NUM and SESSION_ID are initialized to random numbers. The random numbers are used to minimize the chance of interfering with the duplicate packet detector on the server. For TCP the SESSION_ID is set to 0x0000 which is remapped by the server to 0xFFFF.

Figure 5B:
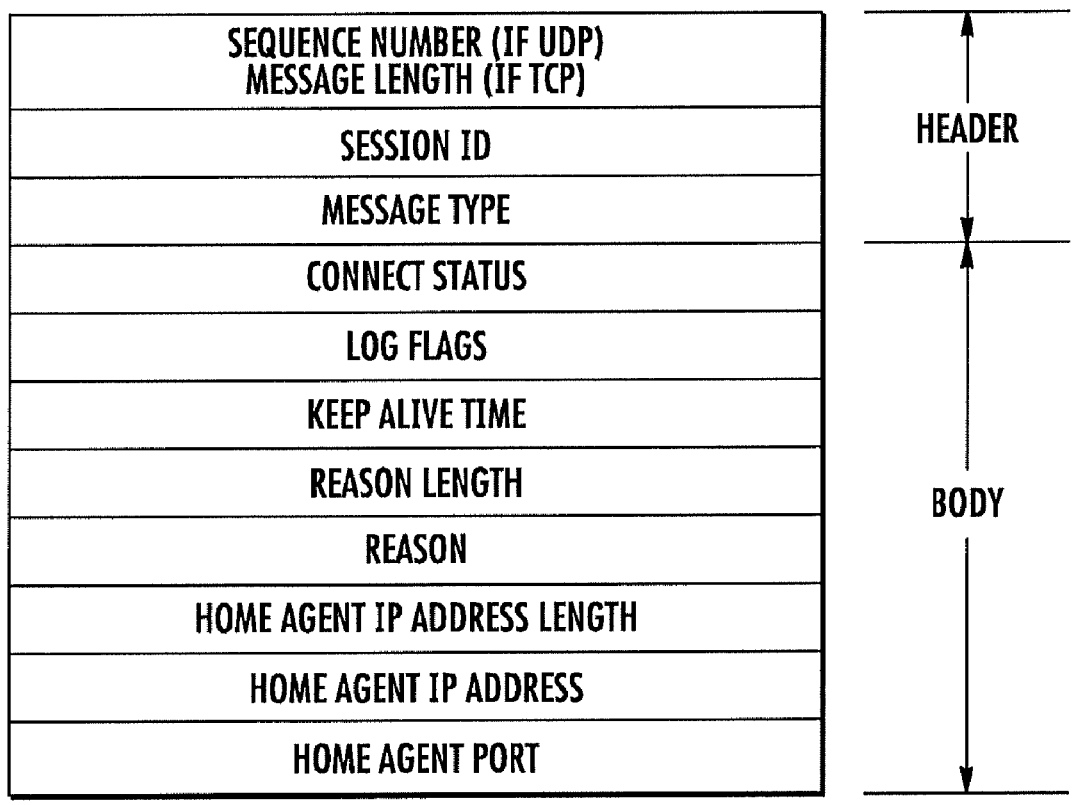

The fields of the connect request message are defined below:
USERNAME: UTF String
PASSWORD: UTF String
PROTO_VER—indicates the version of the protocol the client uses.
LANG_ID—is used to indicate the clients native language.
USERNAME/PASSWORD—are clear text values to are checked by the server to determine if user is authorized to use the fastchat service.
DEVICE_TYPE —field contains a list of attributes of the client device, beginning with DEVICE_CLASS/PLATFORM. Subsequent attributes are name=value pairs, separated by semicolons (;).
DEVICE_CLASS/PLATFORM—This is used by the server to determine the presence profile to use for the client.
Defined descriptors are:
PC/Windows
Mobile/7650
Mobile/P800
Mobile/J2ME
CLIENT_VERSION—This is used by the server to determine which message format to use for responses.
ver=xx.x
MOBILE_NETWORK_CODE
mnc=xxx
MOBILE_COUNTRY_CODE
mcc=xxx FIG. 5B illustrates an inbound server-to-client connection response message 460. The connection response is sent from the server complex to the client to indicate connect status after a connect request. If the client receives a connect success it will immediately reset it's sequence number to 0x0001 (UDP only) and use the session ID that is contained in the message header. If the client is using UDP and the connect response contains a HomeAgent IP and/or Port that are not zero it will immediately reset the socket to the non zero values. If a connect failure occurs, the client closes its socket immediately.

The fields of the connection response message 460 are defined as follows:
CONNECT_STATUS: (SUCCESS=0, FAILURE=1, AUTHORIZATION_FAILED=2)
CONNECT_STATUS—is used by the client to determine it's connect state.
KEEP_ALIVE—This value tells the client how often it should send keep alives to the server. '0 indicates the client should not send keepalives to the server. The formula for determining keep alive rate is (n*10 sec) where n is the value received.
REASON—if CONNECT_STATUS=SUCCESS the length of this string will be empty. If CONNECT_STATUS!=SUCCESS then REASON will contain a string describing the failure reason.
HOME_IP—is used by the client to form a "sticky" connection to the server complex. This field is not used by TCP connections. If the string length is zero the client will ignore this field. It should be noted that although receiving can be used in this field it may cause problems for clients that have problems with DNS. Also the use in DNS will only add to the delay in receiving the next message from the client.
HOME_PORT —has the same semantics as HOME_IP.

Figure 6A:
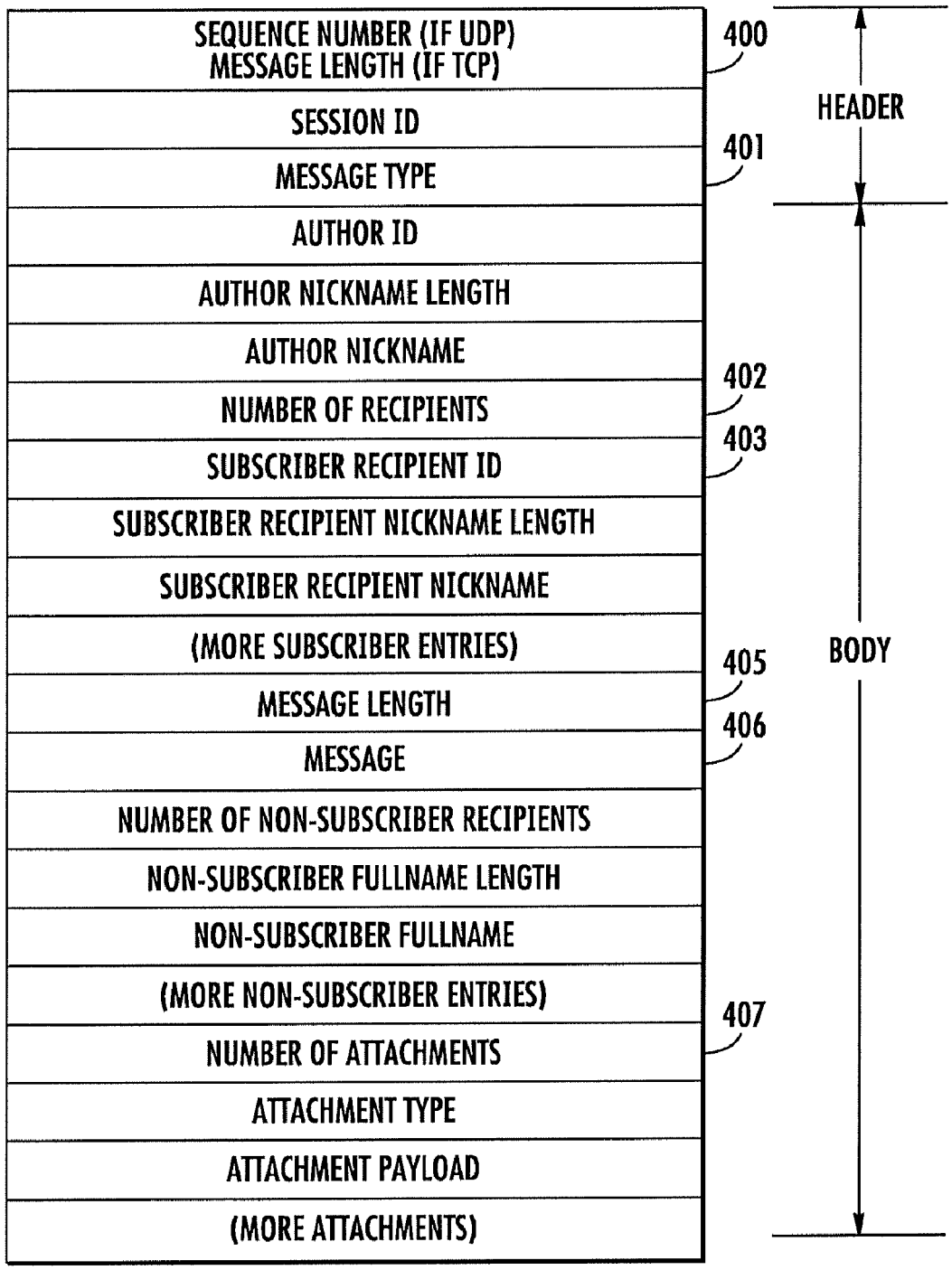
FIGS. 6A-B show schematic illustrations of an inbound and outbound text messages usable in the system of FIG. 1.

FIG. 6A illustrates an outbound client-to-server message 400 that the terminal 22 or networked computer 26 sends to the message broadcaster 303. The outbound message 400 comprises a message type 401 (e.g., text, speech, and so on), a number of intended recipients 402, a plurality of recipient identifiers 403, a message length 405, message content 406, and a number of attachments 407. A thread identifier (not shown) can also be included. Preferably, the mobile terminal 22 generates the thread identifier by aggregating a client identifier and a session identifier with a thread sequence number. The thread sequence number is a terminal-side number that starts from 0 each time a session is initiated. The client increments the thread sequence number by 1 each time the terminal 22 generates a new thread. Although not illustrated in FIG. 4, the payload may contain message encoding types and other attachments (e.g., multimedia attachments such as icons, ring-tones, video, images, audio and the like). Other elements can be added to the outbound message, such as sequence numbers, time stamps, or the like.

The message broadcaster 303, upon receiving the outbound message 400, first compiles a list of target recipients comprising the sender's identifier (i.e., the first recipient identifier in the recipient identifier list 403) and the plurality of other recipient identifiers (i.e., the recipient identifiers in the identifier list 403 other than the sender's identifier). For each target, the message broadcaster 303, determines the status 702 of the target by locating the target's identifier in a presence record 700 with the matching identifier 701. For each available target (i.e., where the presence record indicates that the recipient can receive the message type 401), the broadcast manager 303, composes an inbound message 500. The message broadcaster 304 queries the nickname manager 304 to find the receiver's local nickname set 802-803 for the other recipients (i.e., the identifiers comprising the original list of targets without the receiver's identifier.) If no information is found (i.e., the receiver did not build a nickname record 800 for the particular recipient), the message broadcaster 304 queries the presence manager 302 for the recipient's public nickname information 704-705. The message broadcaster 303 extracts the receiver's address 703 from the presence manager 302 and sends the inbound message 500 to the receiver's terminal 22 via the router 301. To optimize the creation and broadcasting of messages, compression and encoding techniques may be employed, and other information may be included in the inbound message 500, such as sequence numbers, timestamps, and so on.

Figure 6B:
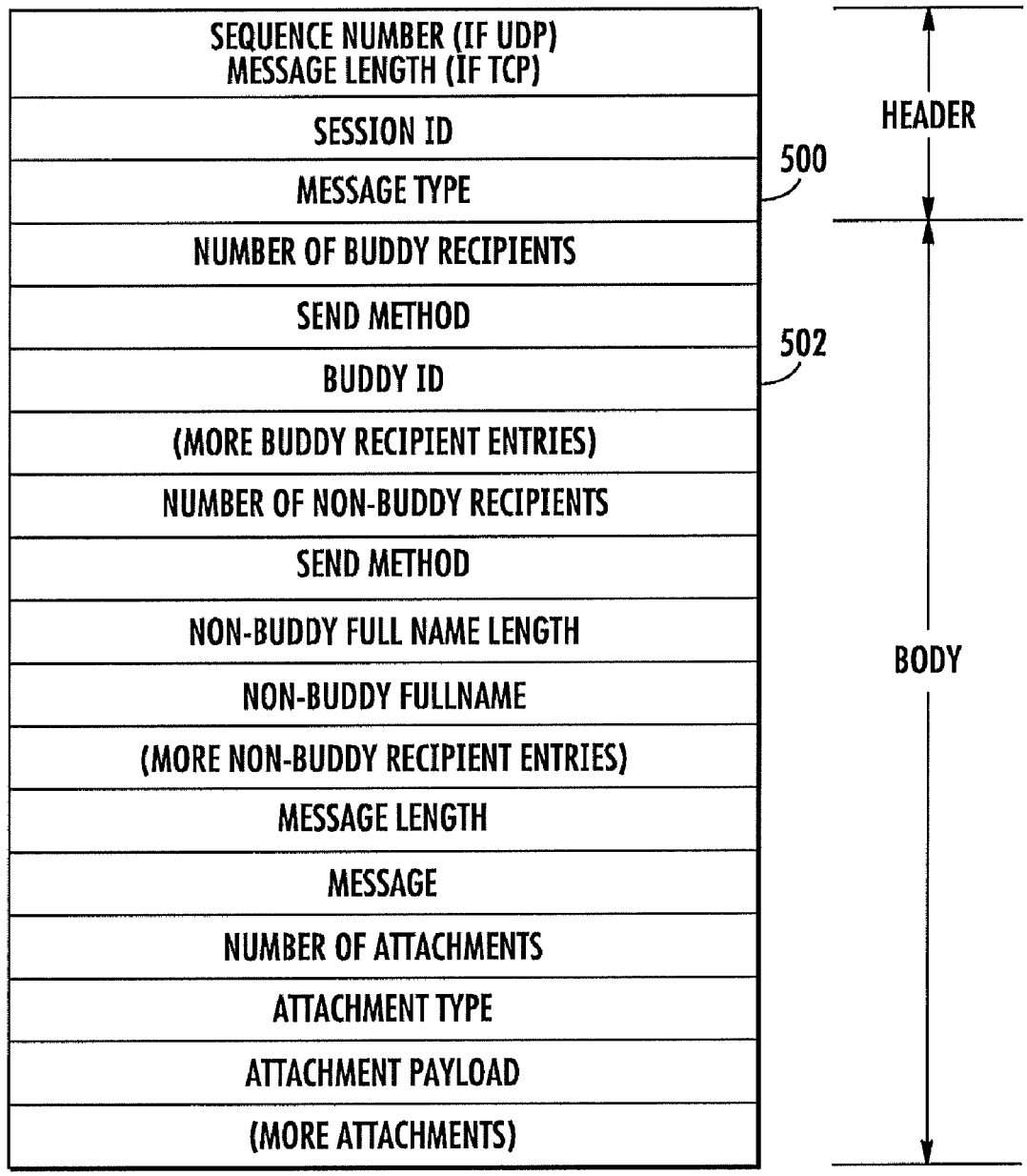

FIG. 6B illustrates an inbound server-to-client text message 500 sent by the server complex 24 to the terminal 22 or networked computer 26. The inbound message 500 preferably comprises the recipient's identification 502. Other attributes can be placed in the inbound message 500 including such things as time stamps, sequence numbers, and so on.

Figure 7:
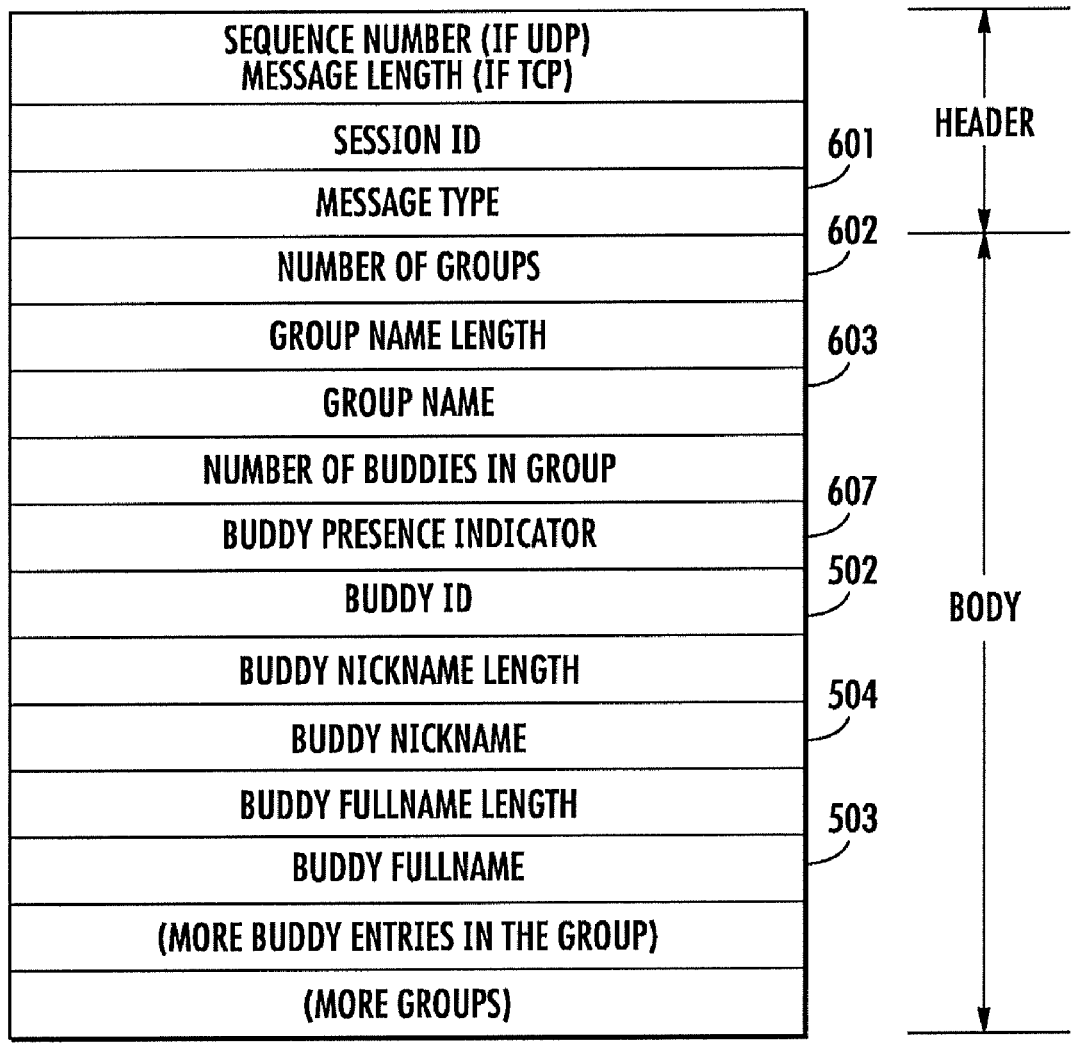
FIG. 7 is a schematic illustration of a buddy list update message usable in the system of FIG. 1.

When a participant's presence status 702 changes, the message broadcaster 303, sends a buddy list update message 600 to other users subscribed to the participant's presence status 702. FIG. 7 illustrates a buddy list update message 600 sent from the server complex 24 to the mobile terminal 22. The message 600 comprises a list type 601 (e.g., alphanumeric list, group list, etc.), the number of groups identified in the message 602, at least one group definition 603-604, and a plurality of user definitions 502-504, 607. Note that the recipient status field 607 indicates the value of the presence status 702. A group definition, in this context, comprises a group name 603 and a plurality of recipient identifiers 604. A recipient's identifier can exist in a plurality of group definitions. However, preferably, there will be only one user definition 502-504, 607. Furthermore, preferably, for each identifier in the list of recipient's identifiers 604, there is at least one user definition 502-504, 607 for that recipient in the buddy list update message 600. The list of ungrouped individuals is a special unnamed group. It comprises the list of recipient identifiers. Preferably, recipient identifiers in an ungrouped definition cannot be in other groups. The records 600 can contain other fields of attributes and information such as presentation icons, audicons, or the like. In addition, it should be noted that the message does not have to contain the entire list of groups and individuals on updates, rather incremental updates could be used instead.

The presence manager 302 may send buddy list update messages 600 to the terminal 22 upon receiving a refresh request from the terminal 22. Those having ordinary skill in the art will recognize other reasons to send buddy list updates (e.g., initial connection,) as well as optimizations in the form of encoding the contents, sending incremental updates instead of the entire list, and so on.

The system 20 of FIG. 1 employs four types of UDP or TCP messages for streaming audio messages between clients: client to server start audio window message, server to client start audio window message, audio message, and end audio window message. Among other things, these messages are used to send push-to-talk voice messages between the mobile terminals 22 and computers 26.

A. Client to Server Start Audio Window Message (a Client to Server or Outbound Message)

This message is transmitted by the client 28,30 to the server complex 24 when the user desires to transmit audio frames. Audio frames received by the server 24 before this message should be discarded.

The fields of the Client to Server Start Audio Window Message are defined below:
MESSAGE_ID—Is used to uniquely identify each audio message of a thread.
THREAD_ID—A UTF string used to inter-relate threads of discussion.
RECIPIENT_COUNT—The number of recipients.
RECIPIENT_ID—The ID of the buddy (or non-buddy) to send the message to.
This may include external system 35,37 mapped recipient identifiers.
 . . . (More RECIPIENT_ID(s)) . . . .
ADHOC_COUNT—The number of adhoc (i.e., full names identifiers) recipients.
These fields may reference (external system 35.37) recipients.
ADHOC_NAME—The UTF String identifier of the fully named recipient.
 . . . (More ADHOC_NAME(s)) . . . .

B. Server to Client Start Audio Window Message (Server to Client)

This message is transmitted by the server complex 24 to the client 28,30 when the client 28,30 is about to start receiving audio frames from another subscriber.

The fields of the Server to Client Start Audio Window Message are defined below:
MESSAGE_ID—Is used to uniquely identify each audio message of a thread.
THREAD_ID—UTF String used to inter-relate threads of discussion.
AUTHOR_ID—The ID of the person who originally sent the message.
AUTHOR_NAME—The UTF string name of the author of the message.
RECIPIENT_COUNT—Indicates how many combinations of RECIPIENT_ID/RECIPIENT_NAME to parse by client 28,30.
RECIPIENT_ID—ID of Recipient.
RECIPIENT_NAME—The UTF string nickname of the recipient.
 . . . (More RECIPIENT JD/RECIPIENT_NAME combinations) . . . .

C. Audio Message (Server to Client and Client to Server)

This message is used to stream audio. It is typically sent multiple times in a sequence, each message carrying a fragment of the complete audio message. This message should not receive an ACK. The message is sent from the sender client 28,30 to the server complex 24, and also from the server complex 24 to the recipient client(s) 28,30.

The fields of the Audio Message are defined below:
MESSAGE_ID—Is used to uniquely identify each audio message.
AUTHOR_ID—Is used to identify the sender in case of multiple incoming streams.
AUDIO_FRAME—Audio content. Short Buffer.
AUDIO_FORMAT—The client 28,30 adds one byte to the beginning of each audio frame to indicate the frame type (e.g., AMR=0, GSM6.10=1, GSM6.10=13).

SEQUENCE_NUM—Starts at 1 for the first frame and is incremented for each audio frame sent. This is done to reduce the load on the server complex 24 by allowing the receiving client 28,30 to manage all re-sequencing of the AUDIO_FRAME(s).

D. End Audio Window Message (Server to Client and Client to Server)

Transmitted by either the client 28,30 or the server complex 24 to delimit the end of an audio transmission. Any Audio frame received after this message should be discarded.

The fields of the End Audio Message are defined below:

MESSAGE_ID—Is used to uniquely identify each audio message.

AUTHOR_ID—Is used to identify the sender in case of multiple incoming streams.

A field can be added to this message indicate the Sequence Number of the last audio frame.

Figure 10:
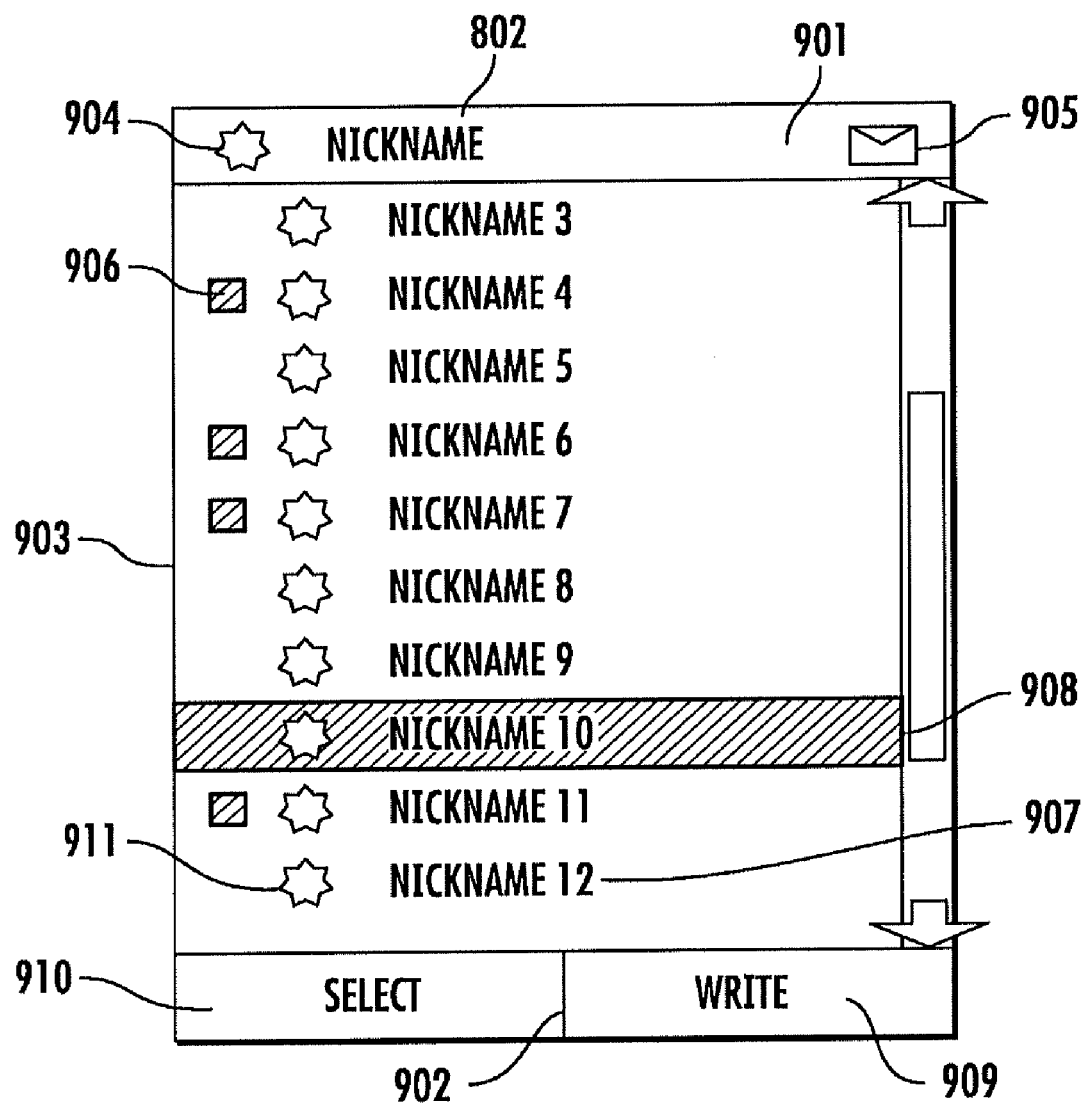
FIG. 10 shows a contact screen of a mobile terminal, presenting an exemplary nickname list in alphabetical order.

FIG. 10 illustrates a buddy list display, presented by the wireless terminal clients 30, with its entries sorted alphabetically. The display is divided into three regions. In a topmost region, there is a title bar region 901 allowing the display of one line of text and graphic symbols (i.e., icons). The software uses this region 901 to provide the user notices and other meta-information about the current task. In the case of the buddy list display, the title bar 901 comprises the user's own presence indicator 904, the user's own public nickname 704, and, on occasion, an inbound message indicator 905. Preferably, the presence indicator 904 is an icon that varies in appearance depending and the presence status 702 (i.e., there is a different and distinguishable feature associated with the various status values). Preferably, the inbound message indictor 905 is an icon accompanied by an audible sound when the icon is first displayed. Combined, the visual and audible notice indicate to the user that there is at least one unheard and/or unread inbound message 500 that has arrived at the terminal 22. If the user's nickname is too long for the title bar 901, the software scrolls the title bar leaving only the inbound message indicator 905 in a fixed position for quick access. There are many familiar examples in the art today of such display techniques, any of which may be incorporated for use with the present invention.

In the middle region of the display is a content region 903. In the case of the buddy list display, the software preferably places a multi-selection list in the content region 903, which list has a plurality of entries each representing a buddy that was received by the terminal 22 from the server complex 24 in a buddy list update message 600 and stored in the temporary storage 309. Each entry can be highlighted 908 by the user. Highlighting and navigating list entries are implemented using common techniques in the art. Each entry in the list comprises a selection indictor 906 that indicates whether the user has selected the particular buddy for chatting (i.e., sending a communication message), the buddy's presence indicator 911, the buddy's nickname 802 or 704, and/or the buddy's short name indicator 907. Note that symbols other than text could serve the same function as the short name indicator 907 for the short name information 705 or 803 as indicated previously. For example, icons or other graphical elements could be used so long as they sufficiently differentiate buddies from one another. Further still, a combination of such graphical elements and text could be used if sufficient screen space is available.

On the bottom of the screen 902 is a softkey label region. Preferably, there is a minimum of two keys 909-910. The number of keys depends on the actual number of softkeys 104 available on the terminal 22. As shown, the left softkey label 910 is "select" while the right softkey label 909 is "write" if there is at least one selected entry in the buddy list. If the user activates the left softkey with a single click (referred to onward as "single-clicking"), the highlighted entry 908 is selected (or deselected if it was already selected,) and consequently its selection indicator 906 changes to reflect the new state. If the user presses and holds (referred to onward as "click-holding") the left softkey, the software presents the user with a plurality of options such as the option to deselect or select the entire list; switch to other displays (e.g., history display described in FIG. 11); request the details of the buddy (e.g., full name, the public nickname set 704 705, etc.); change the nickname set 802-803; show or hide fields (e.g., the short name indicator 907), and so on. It should also be noted that the use of a text string to represent a softkey label is exemplary and only intended to capture the spirit or intent of the invention. Other forms of labels can be used, such as graphical symbols, and the like.

If no buddies are selected, the right softkey label 909 is "messages". Single-clicking or click-holding the right softkey in this context switches the user to history display described in more detail with reference to FIG. 11. If the user pushes the push-to-talk button 101 (referred to onward as pushes-to-talk,) an audible indicator reminds the user that buddies have to be selected first. If there is one or more buddies selected, single-clicking or click-holding the right softkey begins to compose a message for a new thread to the selected buddies. The display in that case switches to the text message editing display described in more detail with reference to FIG. 12. If the user pushes-to-talk, the display switches to the history (shown in FIG. 11), and the user is able to record and transmit a speech message and consequently start a new thread with the selected buddies. The speech message is transferred using the four types of audio messages described above.

The presence status 702 represented on the mobile terminal 22 by presence status indicators 904 and 911 describes availability. Availability in such contexts indicates that a user is able to receive inbound messages 500 (and optionally the type of inbound messages 500.) A status that indicates lack of availability in such contexts presents the fact that a user is unable to receive inbound messages 500 (or a particular type thereof). As such, either the system will drop messages targeting the unavailable user, or it will store the messages for some time until the user is available again.

In addition, the system 20 uses the presence status 702 and presence status indicators 904 and 911 to communicate other information, such as message delivery type. To accomplish this, the user on the mobile terminal 22 is presented with a representation of the means the system will likely use to deliver the message such as using in-band communications over the wireless packet data or through an out-of-band method such as email or IM servers 36, 40. It may also provide a representation of the subset or type of the messages that are likely to be delivered, such as text or voice.

Figure 11:
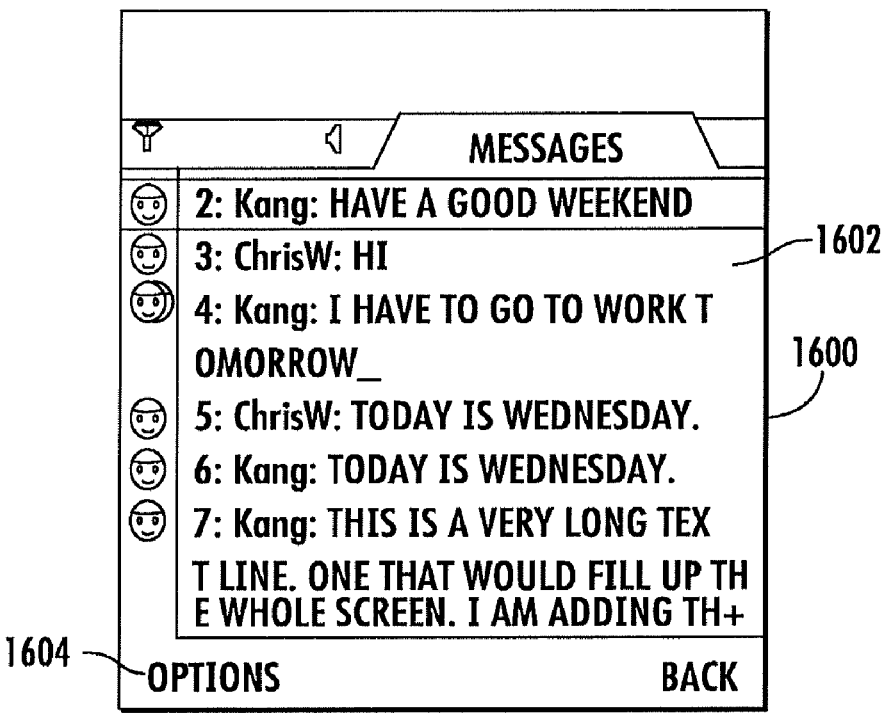
FIGS. 11-12 are schematic illustrations of an exemplary message and editing screen for a mobile terminal.

FIG. 11 illustrates a terminal screen 1600 of the wireless terminals 22 in a first display mode. In the first display mode, the screen 1600 presents the conversation history 1602, as well as graphic user interface (GUI) controls 1604. Other information can also be presented on the screen 1600, as disclosed herein. As shown in the example, the message history 1602 that includes a subset of messages posted by participants in the thread of interest. As described above herein, the displayed messages identify the sender and show the posted text.

Message entries in the content region 1602 can comprise an attachment indicator that indicates if there is any attached content (e.g., documents, files, etc.) or transmitted speech available. Although not illustrated in FIG. 11, there may be other indicators present on an entry such as a locked entry indicator (i.e., indicates that an entry was saved in permanent storage 305 and will always appear in the history display until it is unlocked). Lesser amounts of information may be included in each entry of the display. For example, only the message content could be displayed without the short names of the senders.

Figure 12:
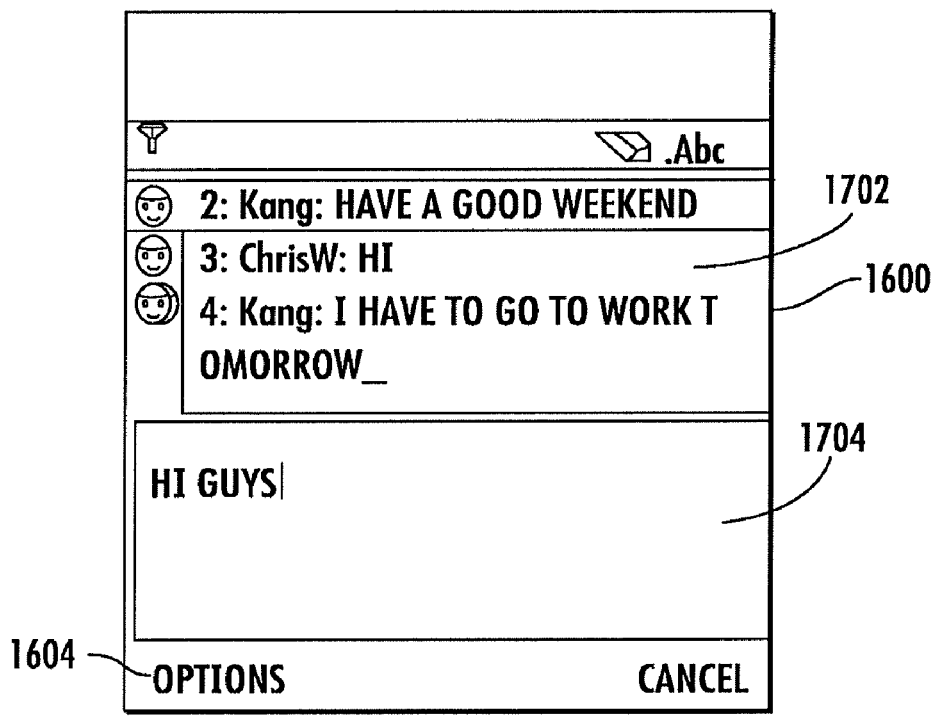

By activating the GUI controls 1604, a user can selectively place the terminal screen 1600 in second mode, as shown in FIG. 12. For example, in the preferred embodiment, the user may select a reply to message or a compose new message option from the selection list control 1604. In the second mode, the screen 1600 presents the smaller history view 1600 with smaller subset of messages 1702 concurrently with a text edit area 1704. The history view 1600 continues to be updated and can scroll on the screen while the text edit area 1704 is presented. A text editor resident on the mobile terminal 22 is also activated so that the user can write one or more text messages in the edit area 1704 while simultaneously viewing the conversation 1702 as it progresses. The GUI controls 1604 permit the user to post the messages composed in the text edit area 1704 to the various conversations. They are then displayed in the history 1702 in chronological order. Preferably, once the user sends the message using the GUI control 1604, the text editor can be deactivated by the user to collapse the text edit area 1704 so that the text edit area 1704 is removed and the screen switches back automatically to the first mode. The history 1702 can then be expanded to occupy the entire screen area.

The screen 1600 can be switched back and forth between the first and second modes using a user-selectable area of the mobile terminal GUI, such as a button or selection included in a pull-down menu or toolbar. However, other user-operable switches, such as a momentary contact switch, key pad (s), configurable soft key(s), or the like can be used to place the terminal display screen into either mode.

Other accommodations could be added. For example, when the screen switches to the second mode the history view 1600 can filter the message in the history to those related to the thread of interested. For example, when the user selects a message in the first mode and chooses to reply to that message, the history view 1600 displays only those messages related to the selected message's thread. Messages (existing or new inbound messages) belonging to other threads of conversation would be hidden until the user returns to the first mode.

The functionality for the display modes illustrated in FIGS. 10-12 can be implemented by software included in the mobile terminal 22, and is preferably implemented by the client application 28.

Figure 13:
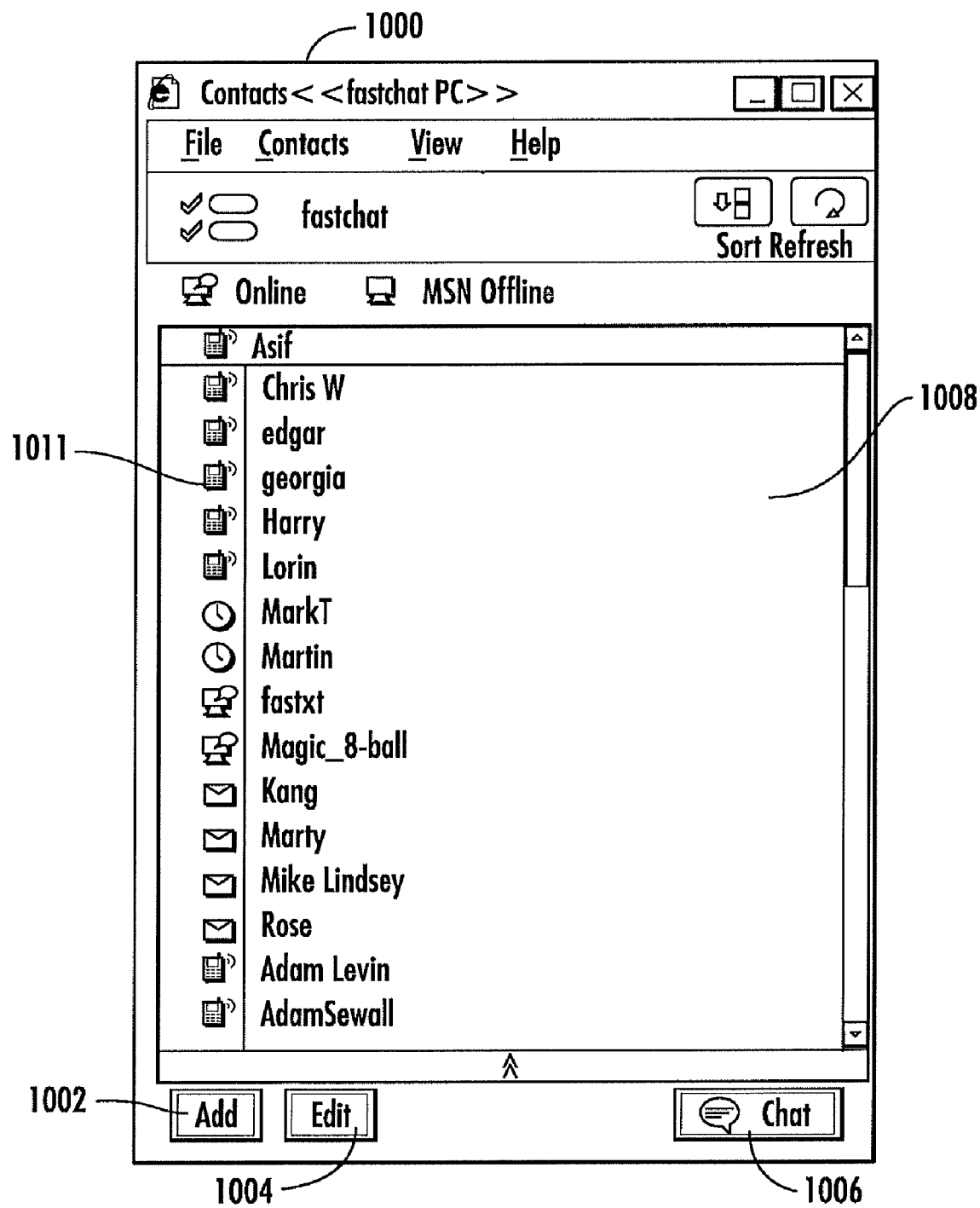
FIG. 13 shows a contact screen of a computer messaging client, presenting an exemplary nickname list.

FIG. 13 illustrates an exemplary buddy list display 1000 of the computer client 30. The display shows a list of buddies 1008 and icons 1011 indicating their availability. Control buttons 1002,1004 allow the user to add new buddies to the list 1008 or edit or delete the existing buddies. A chat control button 1006 allows the user to display the conversation history screen 1100 of FIG. 14 and actively send and receive messages.

Figure 14:
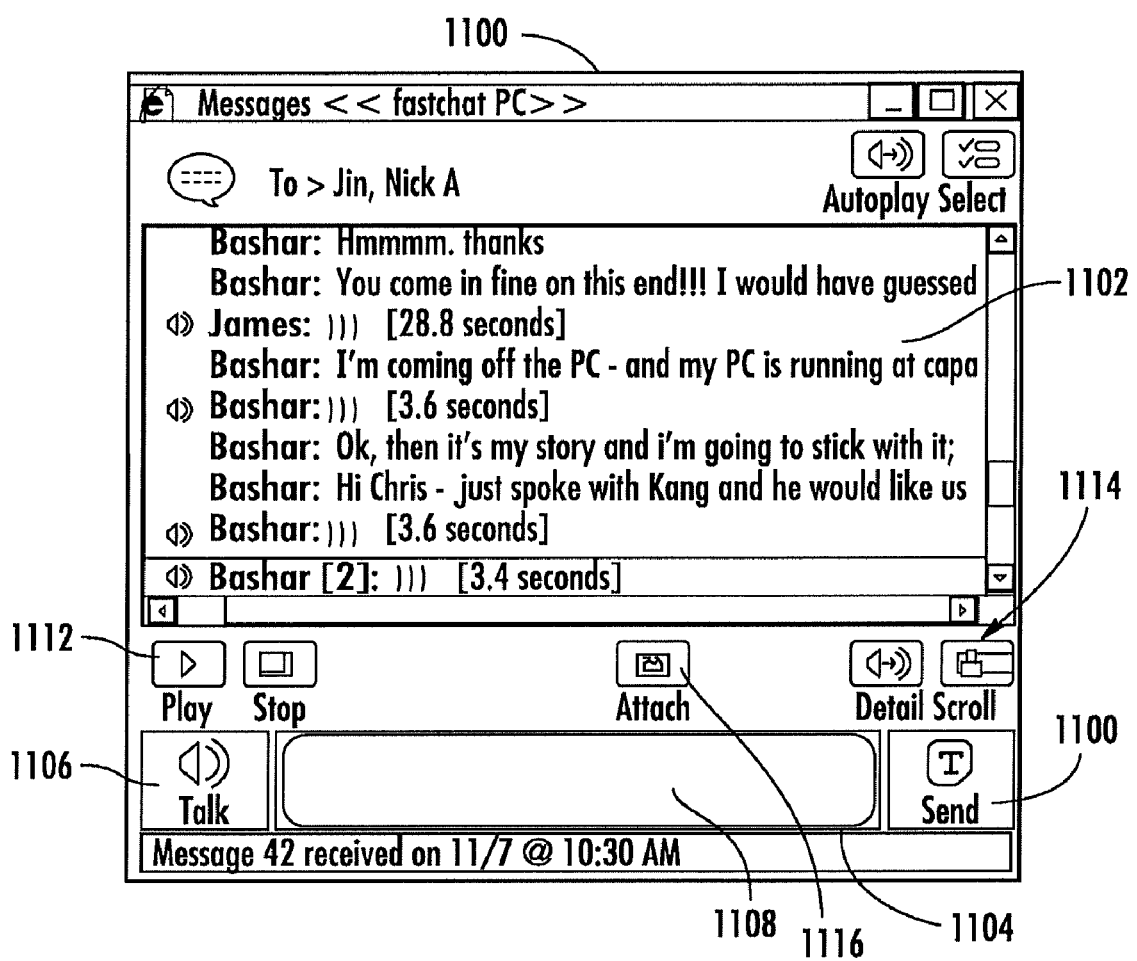
FIG. 14 is a schematic illustration of an exemplary conversation history screen for a networked computer.

FIG. 14 illustrates an exemplary conversation display 1100 of the computer client 30. The content region 1102 of the display is a single selection list comprising a plurality of entries representing inbound messages 500 received by the computer 26 and a plurality of entries representing outbound messages 400 transmitted by the computer 26. Outbound messages are preferably echoed back to the sender in full or in part (e.g., speech messages might not include the actual speech sent) in the form of inbound messages. That is, outbound messages go to the server complex 24 for transmission to the targeted recipient(s). In addition to sending the message to the targeted recipient(s), the message broadcaster sends a copy of the outbound message back to the transmitting computer 26 (or wireless terminal 22) (i.e., the sender) as an inbound message.

In an alternative approach, rather than having the text of an outbound message sent back to the transmitting terminal via an inbound message, the transmitting terminal can locally echo the text to the display directly. In this manner, use of any wireless and networking resources may be minimized.

Message entries in the content region 1102 can comprise an attachment indicator 1103 that indicates if there is any attached content (e.g., documents, files, etc.) or transmitted speech available.

Voice messages may be played automatically upon their receipt. Control buttons 1112 are provided to allow re-play of voice messages. The voice message entry in region 1102 can be selected enabling the playback control buttons can be activated to replay the message.

To view or download attachments, the message entry is selected in region 1102, and the attachment control button 1116 is activated by the user.

The message entries can be scrolled and their details displayed (e.g., sender address, time and date sent, etc) by user activation of soft buttons 1114.

The screen also provide a region 1104 for composing and recording messages to be sent by the user. A talk control button 1106 provides PTT functionality. When the user depresses this button 1106; the computer 26 begins recording and transmitting a voice message. The voice message is continually streamed to other participants in the conversation using the streaming audio messages described above until the button 1106 is released.

To compose text messages, the user enters text using a keyboard or other means in the composition region 1108. The user can edit the text is this region. After the user is satisfied with the test message, he/she can activate the text send control button 1110 to send the message to the other participants in the current conversation.

For both mobile terminals 22 and computers 26, if an inbound speech message arrives while another message is being played, the received speech is queued up. The most recently received speech message (or at least that portion that will fit in available memory) is queued at the receiving terminal. In an alternate approach, such queuing can occur at the server complex such that the recipient can request playback within a predetermined period of time. Further still, queuing could occur at both the terminal and the server-side such that playback may be requested from the server in the event that a given speech message is no longer available at the terminal. When playback of the current message completes, the queued message is played back automatically (unless otherwise configured by the user). Only the last speech message received is automatically played back. The playback is abandoned if the user begins to record and transmit a speech message before the playback had a chance to occur.

Further, for both mobile terminals 22 and networked computers 26, unambiguous delivery of speech messages to the user requires care when integrating multiple multi-modal threads of conversation into a single history display. In the current art, it is difficult for a user to associate speech with a particular discussion threads. The system disclosed herein solves the association problem in two ways. First, as discussed above, each speech message leaves an entry on the display. The entries link to their corresponding threads and represents at least the sender and the list of other recipients of the message. This, however, is not sufficient in cases where the user is unable to view the display while listening to speech messages. For this reason, the system disclosed herein uses a second technique in conjunction with the first. Preferably, when a user selects a thread, all inbound speech messages associated with the selected thread are played back to the user automatically, unless otherwise provisioned by the user. Any inbound speech messages not belonging to the selected thread are not played back automatically. Instead, the mobile terminal 22 presents an audible signal to the user indicating that there is other incoming speech message(s) in other thread(s). The user, at that point, can chose to playback the message or ignore it. Irrespective of whether the incoming speech message is played, the text portion of the incoming speech message is presented on the display. This helps the user in the decision process of choosing to listen to the message or ignoring it. Further optimizations are possible. For example, the user can be given the option to drop the message. Any speech data being transmitted is then dropped and the server is notified that it can stop transmitting the remainder of the speech message and begin transmitting the next message in the queue (if one exists).

While various embodiments of the invention have been described, it will be apparent to those of ordinary skill in the art that many more embodiments and implementations are possible that are within the scope of this invention. For example, other combinations of the systems, devices, software and methods described in this disclosure are possible without departing from the spirit and scope of the present invention. What has been described above is merely illustrative of the application of the principles of the present invention.

What is claimed is:

1. A communication system comprising:
    a first wireless mobile terminal for operating on a first wireless carrier network to communicate using a push-to-talk (PTT) mode;
    a second wireless mobile terminal for operating on a second wireless carrier network different than the first wireless carrier network to communicate using the PTT mode;
    a networked computer for operating on a packet network to communicate using the PTT mode; and
    a message server operating on the packet network, and residing outside of the first and second wireless carrier networks, to exchange PTT messages among the first wireless mobile terminal, the second wireless mobile terminal and the networked computer;
    said message server is configured to
        store a user identification (ID) and user password for logging into an external instant messaging (IM) system,
        log into the external IM system as a proxy on behalf of a PTT message sender using the stored user ID and user password,
        determine whether an intended recipient of a PTT message is an IM client located within the external IM system, and
        forward the PTT message using the message sender's external IM service account.

2. The communication system of claim 1 wherein said first wireless mobile terminal uses a first transfer protocol to communicate PTT messages with said message server, and said second wireless mobile terminal uses a second transfer protocol, different from the first transfer protocol, to communicate PTT messages with said message server.

3. The communication system of claim 2 wherein said message server includes a gateway for the first and second transfer protocols.

4. The communication system of claim 1 wherein said message server is further configured to:
    transcode a PTT voice message into a digitized voice message formatted for playback using a web browser multimedia plug-in; and
    store the digitized voice message in a voice message database.

5. The communication system of claim 4 wherein said message server is further configured to:
    assign a universal resource locator (URL) to the stored digitized voice message;
    imbed the URL in a text message; and
    send the text message with the imbedded URL.

6. The communication system of claim 1 wherein said message server is configured to:
    store a user identification (ID) and user password for logging into an external email system; and
    determine whether an intended recipient of a PTT message is an email client located within the external email system.

7. The communication system of claim 6 wherein the message server is further configured to:
    log into the external email system as a proxy on behalf of the PTT message sender using the stored user ID and user password; and
    forward the PTT message using the message sender's external email service account.

8. The communication system of claim 7 wherein said message server is further configured to:
    transcode a PTT voice message into a digitized voice message formatted for playback using a web browser multimedia plug-in; and
    store the digitized voice message in a voice message database.

9. The communication system of claim 8 wherein said message server is further configured to:
    assign a universal resource locator (URL) to the stored digitized voice message;
    imbed the URL in an email message; and
    send the email message with the imbedded URL.

10. The communication system of claim 1 wherein said message server is further configured to implement a keep-alive strategy to maintain an active communication session between said message server and at least one of said first and second wireless mobile terminals.

11. The communication system of claim 10 wherein the keep-alive strategy comprises periodically sending a keep-alive message.

12. The communication system of claim 10 wherein said message server is further configured to implement a back-off strategy based upon a timeout period for the active communication session.

13. The communication system of claim 12 wherein the timeout period comprises a dynamically variable timeout period.

14. A communication system comprising:
    a first wireless mobile terminal for operating on a first wireless carrier network to communicate using a push-to-talk (PTT) mode;
    a second wireless mobile terminal for operating on a second wireless carrier network different than the first wireless carrier network to communicate using the PTT mode;

a networked computer for operating on a packet network to communicate using the PTT mode; and a message server operating on the packet network, and residing outside of the first and second wireless carrier networks, to exchange PTT messages among the first wireless mobile terminal, the second wireless mobile terminal and the networked computer;

said first wireless mobile terminal using a first transfer protocol to communicate PTT messages with said message server, and said second wireless mobile terminal using a second transfer protocol to communication PTT messages with said message server;

said message server is configured to implement a keep-alive strategy to maintain an active communication session between said message server and at least one of said first and second wireless mobile terminals, store a user identification (ID) and user password for logging into an external instant messaging (IM) system, log into the external IM system as a proxy on behalf of a PTT message sender using the stored user ID and user password, determine whether an intended recipient of a PTT message is an IM client located within the external IM system, and forward the PTT message using the message sender's external IM service account.

15. The communication system of claim 14 wherein said message server is further configured to:

transcode a PTT voice message into a digitized voice message formatted for playback using a web browser multimedia plug-in;

store the digitized voice message in a voice message database;

assign a universal resource locator (URL) to the stored digitized voice message;

imbed the URL in a text message; and send the text message with the imbedded URL.

16. The communication system of claim 14 wherein said message server is configured to:

store a user identification (ID) and user password for logging into an external email system;

determine whether an intended recipient of a PTT message is an email client located within the external email system;

log into the external email system as a proxy on behalf of the PTT message sender using the stored user ID and user password; and forward the PTT message using the message sender's external email service account.

17. The communication system of claim 16 wherein said message server is further configured to:

transcode a PTT voice message into a digitized voice message formatted for playback using a web browser multimedia plug-in;

store the digitized voice message in a voice message database;

assign a universal resource locator CURL) to the stored digitized voice message;

imbed the URL in an email message; and send the email message with the imbedded URL.

18. The communication system of claim 14 wherein said message server is further configured to implement a back-off strategy based upon a timeout period for the active communication session.

19. A method for communication using first and second wireless mobile terminals on respective different first and second wireless carrier networks to communicate using a push-to-talk (PTT) mode, and a networked computer for communicating using the PTT mode via a packet network, the method comprising:

exchanging PTT messages among the first wireless mobile terminal, the second wireless mobile terminal and the networked computer using a message server operating on the packet network and, residing outside of the first and second wireless carrier networks; and using the message server to store a user identification (ID) and user password for logging into an external instant messaging (IM) system, log into the external IM system as a proxy on behalf of a PTT message sender using the stored user ID and user password, determine whether an intended recipient of a PTT message is an IM client located within the external IM system, and forward the PTT message using the message sender's external IM service account.

20. The method of claim 19 wherein the first wireless mobile terminal uses a first transfer protocol to communicate PTT messages with the message server, and the second wireless mobile terminal uses a second transfer protocol, different from the first transfer protocol, to communicate PTT messages with the message server.

21. The communication system of claim 19 further comprising using the message server to:

transcode a PTT voice message into a digitized voice message formatted for playback using a web browser multimedia plug-in;

store the digitized voice message in a voice message database;

assign a universal resource locator (URL) to the stored digitized voice message;

imbed the URL in a text message; and send the text message with the imbedded URL.

22. The method of claim 19 further comprising using the message server to:

store a user identification (ID) and user password for logging into an external email system;

determine whether an intended recipient of a PTT message is an email client located within the external email system;

log into the external email system as a proxy on behalf of the PTT message sender using the stored user ID and user password; and forward the PTT message using the message sender's external email service account.

23. The method of claim 22 further comprising using the message server to:

transcode a PTT voice message into a digitized voice message formatted for playback using a web browser multimedia plug-in;

store the digitized voice message in a voice message database;

assign a universal resource locator (URL) to the stored digitized voice message;

imbed the URL in an email message; and send the email message with the imbedded URL.

24. The method of claim 19 further comprising using the message server to implement a keep-alive strategy to maintain an active communication session between the message server and at least one of the first and second wireless mobile terminals.

25. The method of claim 19 further comprising using the message server to implement a back-off strategy based upon a timeout period for the active communication session.

* * * * *

UNITED STATES PATENT AND TRADEMARK OFFICE
CERTIFICATE OF CORRECTION

| | | |
|---|---|---|
| PATENT NO. | : 8,001,181 B2 | Page 1 of 1 |
| APPLICATION NO. | : 12/615480 | |
| DATED | : August 16, 2011 | |
| INVENTOR(S) | : Christopher Robert Dale Wilson, Mihaela Kamenova Mihaylova and Joseph Alan Page | |

It is certified that error appears in the above-identified patent and that said Letters Patent is hereby corrected as shown below:

In Claim 14, at column 23, line 11, the word "communication" should be changed to "communicate".

In Claim 17, at column 23, line 59, the word "CURL)" should be changed to "(URL)".

Signed and Sealed this

Twentieth Day of December, 2011

David J. Kappos
*Director of the United States Patent and Trademark Office*